United States Patent [19]

Nakano

[11] Patent Number: 5,537,345
[45] Date of Patent: Jul. 16, 1996

[54] MATHEMATICAL FUNCTION PROCESSOR UTILIZING TABLE INFORMATION

[75] Inventor: Hiraku Nakano, Kyoto, Japan

[73] Assignee: Matsushita Electrical Industrial Co. Ltd., Osaka, Japan

[21] Appl. No.: 322,537

[22] Filed: Oct. 13, 1994

[30] Foreign Application Priority Data

Oct. 14, 1993 [JP] Japan .................................. 5-256626

[51] Int. Cl.$^6$ ........................................................ G06F 7/38
[52] U.S. Cl. .................................... 364/752; 364/748
[58] Field of Search .................................. 364/748, 751, 364/752, 754, 761, 764, 765

[56] References Cited

U.S. PATENT DOCUMENTS

| | | | |
|---|---|---|---|
| 4,193,115 | 3/1980 | Albus | 395/26 |
| 4,215,402 | 7/1980 | Mitchell et al. | 395/421.06 |
| 4,928,274 | 5/1990 | Gilhousen et al. | 370/92 |
| 5,065,352 | 11/1991 | Nakano | 364/765 |
| 5,157,624 | 10/1992 | Hesson | 364/748 |
| 5,278,782 | 1/1994 | Nakano | 364/752 |

FOREIGN PATENT DOCUMENTS

| | | |
|---|---|---|
| 61-243532 | 10/1986 | Japan . |
| 5-138725 | 6/1991 | Japan . |
| 3-156531 | 7/1991 | Japan . |
| 3-192429 | 8/1991 | Japan . |
| 5-313861 | 11/1993 | Japan . |

*Primary Examiner*—Roy N. Envall, Jr.
*Assistant Examiner*—Emmanuel L. Moise
*Attorney, Agent, or Firm*—Willian Brinks Hofer Gilson & Lione

[57] ABSTRACT

An input register holds, as an input operand to be square rooted, a floating-point number with an exponential radix is 2. An approximation of the reciprocal of a square root is retrieved from a table information store unit by an address composed of a least significant bit of an exponent and upper bits of a mantissa provided from the input register. The mantissa, with a leading bit appended, is normalized by a normalization circuit in units of two bits. An output of a remainder hold circuit in which a 0th remainder serves as a normalized operand is multiplied by a retrieved approximation to find a partial square root. Partial square roots found in iterative calculations are merged by a digit place alignment circuit and an adder. By making use of an inverter, a multiplicand generator, and an (R+S×T) arithmetic unit, a remainder being used in the next iterative calculation is found by subtracting a product of the merged square root times the partial square root from a remainder found in the preceding iterative calculation.

16 Claims, 32 Drawing Sheets

FIG.3

| MULTIPLIER BITS | | | | OPERATIONAL MULTIPLES |
|---|---|---|---|---|
| SETS (SCANNING) | | | LOWER SET UPPER BITS | |
| $a_{j+1}$ | $a_j$ | | $a_{j-1}$ | |
| 0 | 0 | | 0 | 0 |
| 0 | 0 | | 1 | +1 |
| 0 | 1 | | 0 | +1 |
| 0 | 1 | | 1 | +2 |
| 1 | 0 | | 0 | −2 |
| 1 | 0 | | 1 | −1 |
| 1 | 1 | | 0 | −1 |
| 1 | 1 | | 1 | 0 |

FIG. 4A

| | BIT NUMBER | 4444 3333 3333 |
| --- | --- | --- |
| | | 3210 9876 5432 |

INPUT OPERAND
NORMALIZED MANTISSA

REMAINDER (0)
SQR ROOT RECIPROCAL APPROX. (SRRA)

| | |
| --- | --- |
| REMAINDER (0) × SRRA | 0000 1000 0000 |
| PARTIAL SQR ROOT $b_1$ | |
| $b_1$ (MULTIPLICAND) | |
| 12-BIT LEFT-SHIFT REMAINDER (0) | 00 1000 |
| $b_1 \times b_1$ | 00 1000 |

REMAINDER (1)

| | |
| --- | --- |
| REMAINDER (1) × SRRA | 1111 1110 0101 |
| PARTIAL SQR ROOT $b_2$ | |
| ($b_1 \times 2 + b_2$) (MULTIPLICAND) | |
| 12-BIT LEFT-SHIFT REMAINDER (1) | 1111 1111 1110 |
| ($b_1 \times 2 + b_2$) × $b_2$ | 1111 1111 1110 |

REMAINDER (2)

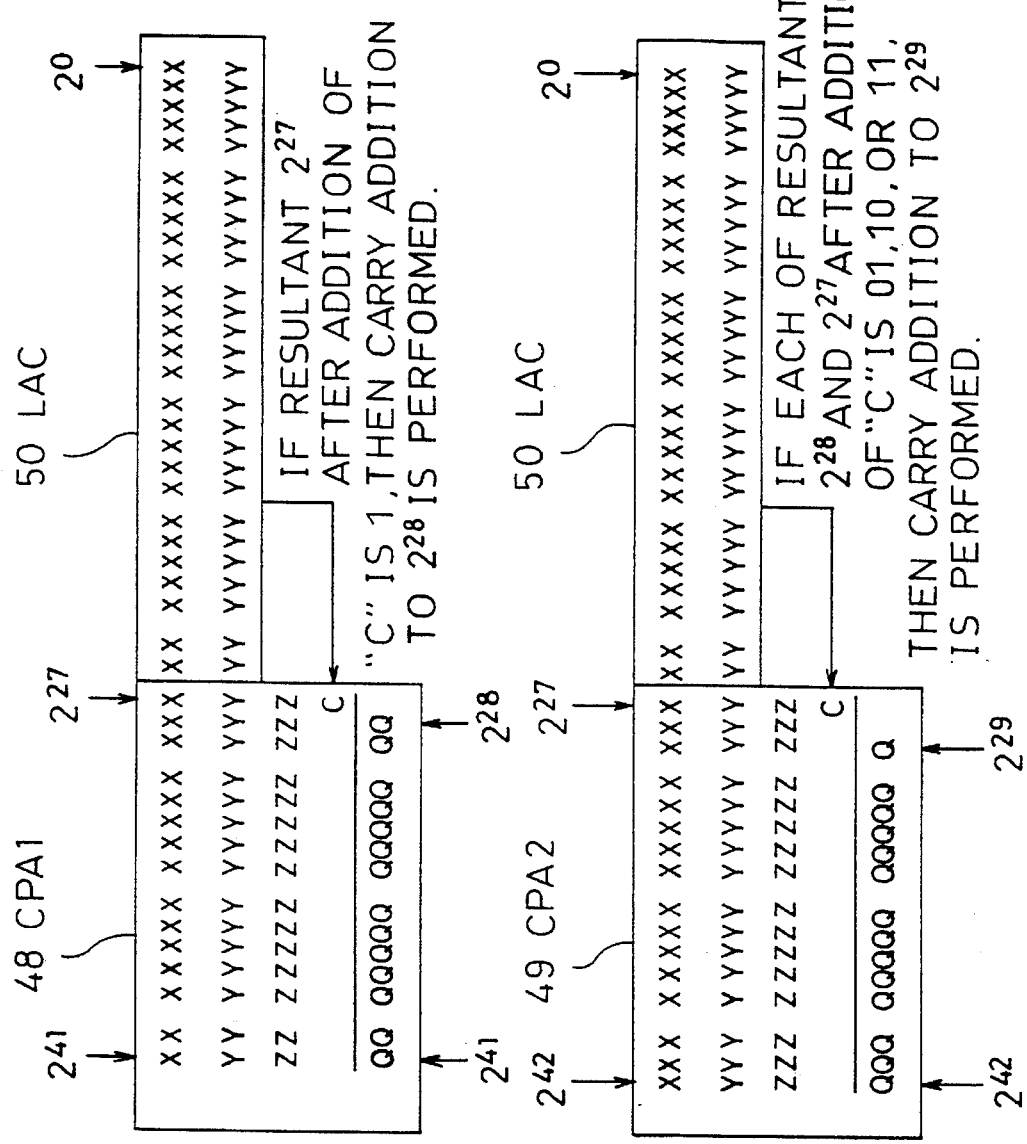

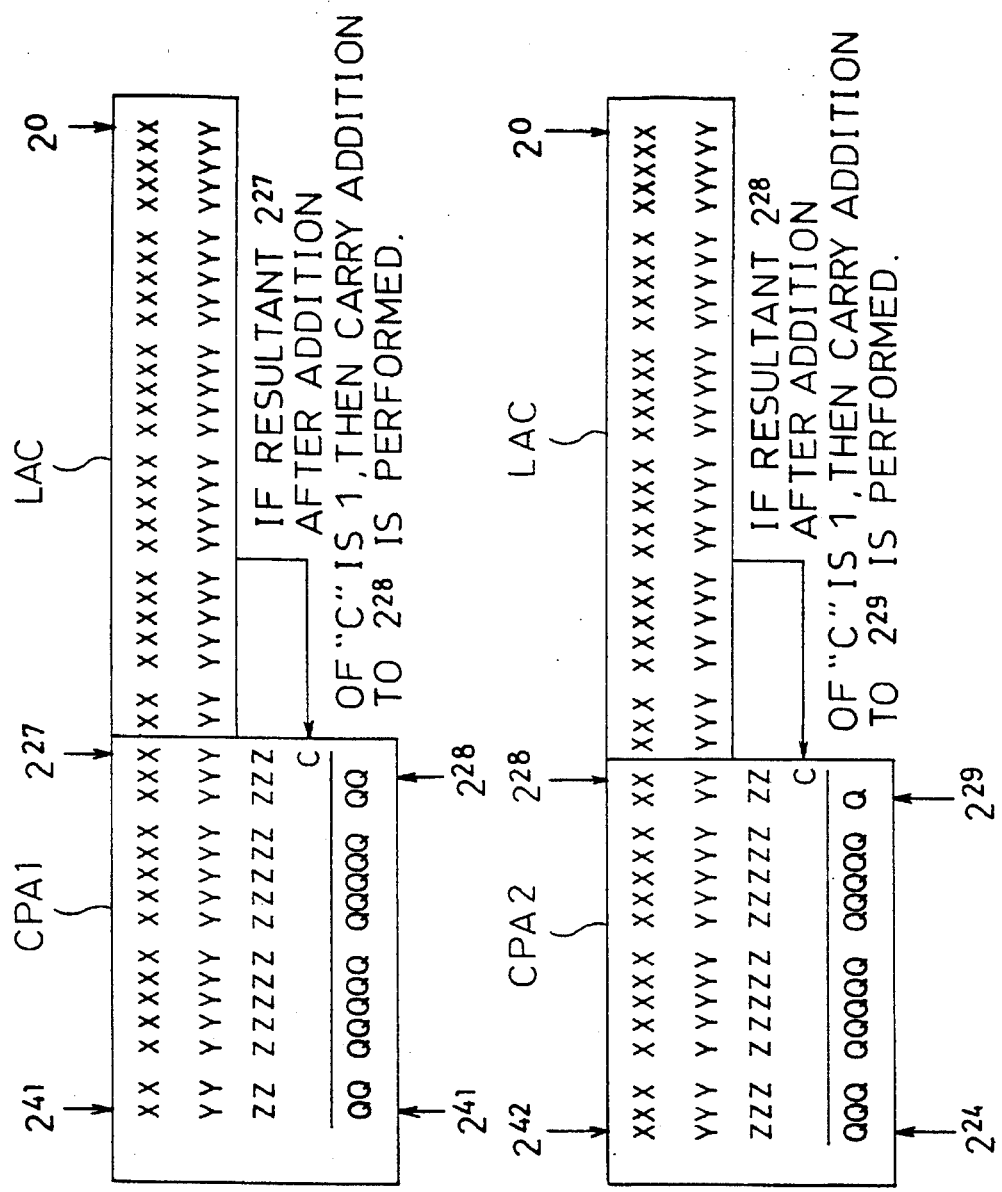

F I G. 13
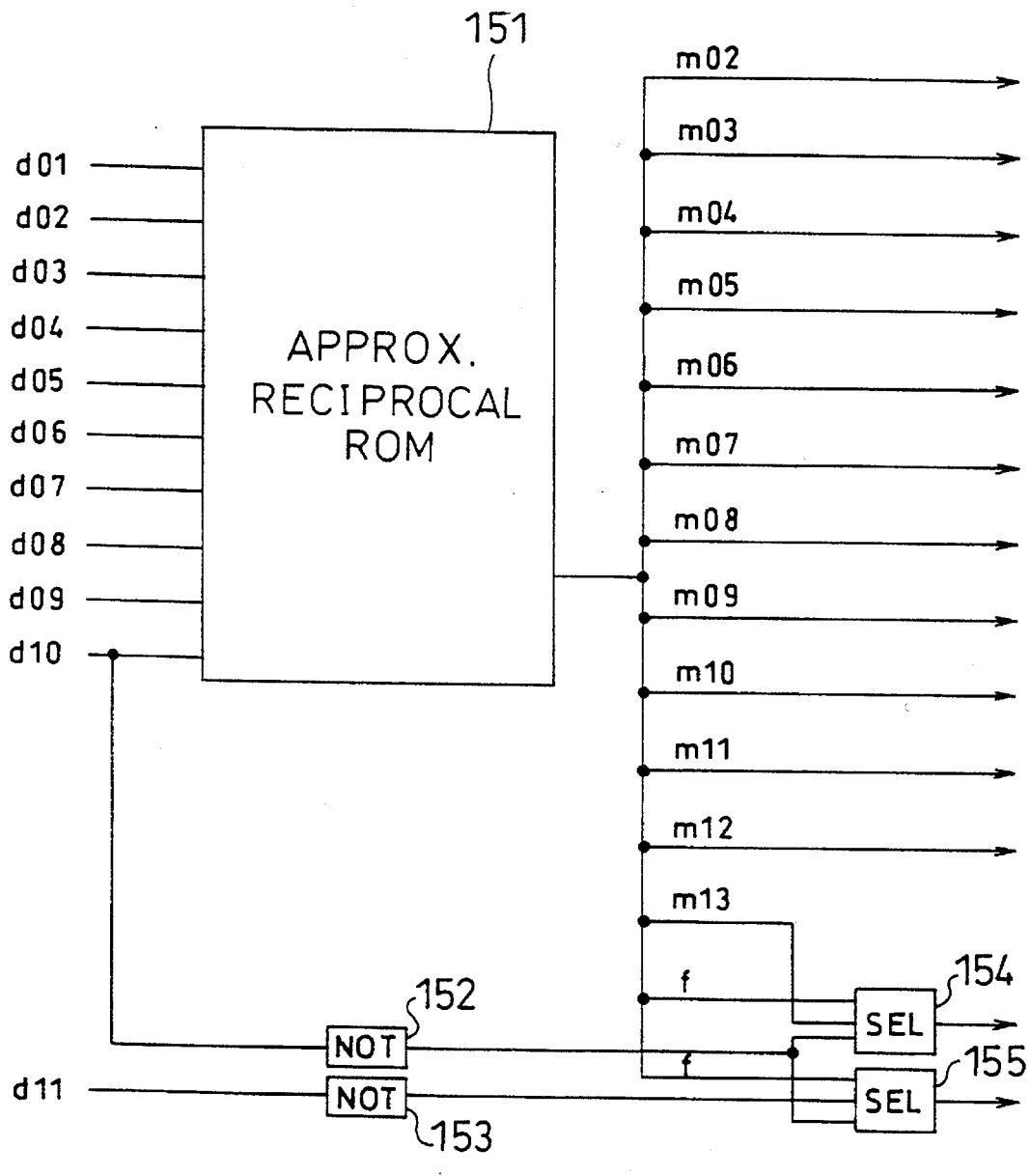
151: (m02, m03, m04, ···, m12, m13, f)
FOR THE CASE OF 9-BIT ADDRESS, m13=0, f=1.
FOR THE CASE OF 10-BIT ADDRESS, f=0.

161: (m02, m03, m04, ···, m12, m13)
FOR THE CASE OF 10-BIT ADDRESS

162: (m02, m03, m04, ···, m12, m13, f)
FOR THE CASE OF 9-BIT ADDRESS, m13=0, f=1.
FOR THE CASE OF 10-BIT ADDRESS, f=0.

FIG. 15

| BIT NUMBER | 4 / 0 | 3333 3333 / 9876 5432 | 3322 2222 / 1098 7654 | 2222 1111 / 3210 9876 | 1111 / 5432 | 1100 0000 / 1098 7654 | 0000 0000 / 3210 |
|---|---|---|---|---|---|---|---|
| Do (MULTIPLICAND) | | | 1. | dddd dddd / 0000 0000 / 1234 5678 | dddd / 0111 / 9012 | dddd dddd / 1111 1112 / 3456 7890 | dddd dddd / 2222 2222 / 1234 |
| −M (MULTIPLIER) FOR 10-BIT ADDRESS | | | | | 1.0 | mmmm mmmm / 0000 0000 / 2345 6789 | mmmm mmmm d / 1111 1111 1 / 0123 1 |
| FOR 9-BIT ADDRESS | | | | | 1.0 | mmmm mmmm / 0000 0000 / 2345 6789 | mmmm mmmm d / 1111 1111 1 / 0120 0 |
| G−1 = Do × (−M) | 1 | 111.0 0000 | 0000 0xxx | xxxx xxxx | xxxx | xxxx xxxx | xxxx xxxx |

FIG. 21

| α | 1 | 2 | 3 | 4 | 5 | 6 | 7 | 8 | 9 | 10 | 11 |
|---|---|---|---|---|---|---|---|---|---|---|---|
| INTERVAL COUNT (LEADING BIT=0) | 4 | 8 | 16 | 32 | 64 | 128 | 256 | 512 | 1024 | 2048 | 4096 |
| LEADING BIT=1 INTERVAL COUNT (REQUIRING NO REDIVISION) | 2 | 4 | 5 | 9 | 23 | 46 | 84 | 156 | 342 | 678 | 1283 |
| LEADING BIT=1 INTERVAL COUNT (REQUIRING REDIVISION) | 0 | 0 | 3 | 7 | 9 | 18 | 44 | 100 | 170 | 346 | 765 |
| SUB TOTAL | 2 | 4 | 8 | 16 | 32 | 64 | 128 | 256 | 512 | 1024 | 2048 |
| TABLE ENTRY COUNT (PRESENT INVENTION) | 6 | 12 | 27 | 55 | 105 | 210 | 428 | 868 | 1706 | 3418 | 6909 |
| TABLE ENTRY COUNT (PRIOR ART) | 8 | 16 | 32 | 64 | 128 | 256 | 512 | 1024 | 2048 | 4096 | 8192 |
| RATIO OF TABLE ENTRY COUNT | 0.75 | 0.75 | 0.84 | 0.86 | 0.82 | 0.82 | 0.84 | 0.85 | 0.83 | 0.83 | 0.84 |

FIG. 24

| ADDRESSES (DECIMAL) | DIVISOR UPPER 11 BITS | APPROX. RECIPROCAL | LEFT LINE SEGMENT MIN | LEFT LINE SEGMENT MAX | RIGHT LINE SEGMENT MIN | RIGHT LINE SEGMENT MAX |
|---|---|---|---|---|---|---|
| 904/905 | 1.E20 | 0.87D | 0.FFD3C0 | 0.FFF5B8 | 0.FFD794 | 0.FFF988 |
| 906/907 | 1.E28 | 0.87A | 0.FFBD38 | 0.FFDF24 | 0.FFC0F8 | 0.FFE2E0 |
|  |  | 0.87B | 0.FFDB60 | 0.FFFFD50 | 0.FFDF24 | 1.000110 |
| 908/909 | 1.E30 | 0.878 | 0.FFC4B0 | 0.FFE694 | 0.FFC860 | 0.FFEA40 |
| 910/911 | 1.E38 | 0.876 | 0.FFCC08 | 0.FFEDE4 | 0.FFCFA8 | 0.FFF180 |

(ALL 9-BIT ADDRESSES)

FIG. 25

| ADDRESSES (DECIMAL) | DIVISOR UPPER 11 BITS | APPROX. RECIPROCAL | LEFT LINE SEGMENT MIN | LEFT LINE SEGMENT MAX | RIGHT LINE SEGMENT MIN | RIGHT LINE SEGMENT MAX |
|---|---|---|---|---|---|---|
| 904/905 | 1.E20 | 0.87D | 0.FFD3C0 | 0.FFF5B8 | 0.FFD794 | 0.FFF988 |
| 906 | 1.E28 | 0.87C0 | 0.FFEA74 | 0.FFFB6D | 0.FFEC58 | 0.FFFD50 |
| 907 | 1.E2C | 0.87A8 | 0.FFDF24 | 0.FFF01A | 0.FFE103 | 0.FFF1F8 |
| 908/909 | 1.E30 | 0.878 | 0.FFC4B0 | 0.FFE694 | 0.FFCB60 | 0.FFEA40 |
| 910/911 | 1.E38 | 0.876 | 0.FFCC08 | 0.FFEDE4 | 0.FFCFA8 | 0.FFF180 |

(9- AND 10-BIT ADDRESSES)

FIG. 27

| INPUT | | | OUTPUT | | | | | | | |
|---|---|---|---|---|---|---|---|---|---|---|
| d01 (d04) (d07) | d02 (d05) (d08) | d03 (d06) (d09) | 0 (0) (0) | 128 (16) (2) | 256 (32) (4) | 384 (48) (6) | 512 (64) (8) | 640 (80) (10) | 768 (96) (12) | 896 (112) (14) |
| 0 | 0 | 0 | 1 | 0 | 0 | 0 | 0 | 0 | 0 | 0 |
| 0 | 0 | 1 | 0 | 1 | 0 | 0 | 0 | 0 | 0 | 0 |
| 0 | 1 | 0 | 0 | 0 | 1 | 0 | 0 | 0 | 0 | 0 |
| 0 | 1 | 1 | 0 | 0 | 0 | 1 | 0 | 0 | 0 | 0 |
| 1 | 0 | 0 | 0 | 0 | 0 | 0 | 1 | 0 | 0 | 0 |
| 1 | 0 | 1 | 0 | 0 | 0 | 0 | 0 | 1 | 0 | 0 |
| 1 | 1 | 0 | 0 | 0 | 0 | 0 | 0 | 0 | 1 | 0 |
| 1 | 1 | 1 | 0 | 0 | 0 | 0 | 0 | 0 | 0 | 1 |

FIG. 29

| ADDRESSES (DECIMAL) | DIVISOR UPPER 11 BITS | APPROX. RECIPROCAL |
|---|---|---|
| 64 | 1.0001000000 | 0.1111000010111 |
| 65 | 1.0001000001 | 0.1111000010000 |
| 66 | 1.0001000010 | 0.1111000001001 |
| 67 | 1.0001000011 | 0.1111000000010 |
| 68 | 1.0001000100 | 0.1110111111011 |
| 69 | 1.0001000101 | 0.1110111110100 |
| 70 | 1.0001000110 | 0.1110111101101 |
| 71 | 1.0001000111 | 0.1110111100110 |
| 72 | 1.0001001000 | 0.1110111011111 |
| 73 | 1.0001001001 | 0.1110111011000 |
| 74 | 1.0001001010 | 0.1110111010001 |
| 75 | 1.0001001011 | 0.1110111001010 |
| 76 | 1.0001001100 | 0.1110111000011 |
| 77 | 1.0001001101 | 0.1110110111100 |
| 78 | 1.0001001110 | 0.1110110110110 |
| 79 | 1.0001001111 | 0.1110110101111 |
| 80 | 1.0001010000 | 0.1110110101000 |
| 81 | 1.0001010001 | 0.1110110100001 |
| 82 | 1.0001010010 | 0.1110110011010 |
| 83 | 1.0001010011 | 0.1110110010011 |
| 84 | 1.0001010100 | 0.1110110001100 |
| 85 | 1.0001010101 | 0.1110110000110 |

FIG. 30

| ADDRESSES (DECIMAL) | DIVISOR UPPER 11 BITS | APPROX. RECIPROCAL |
|---|---|---|
| 86  | 1.0001010110 | 0.111010 1111111 |
| 87  | 1.0001010111 | 0.111010 1111000 |
| 88  | 1.0001011000 | 0.111010 1110001 |
| 89  | 1.0001011001 | 0.111010 1101010 |
| 90  | 1.0001011010 | 0.111010 1100100 |
| 91  | 1.0001011011 | 0.111010 1011101 |
| 92  | 1.0001011100 | 0.111010 1010110 |
| 93  | 1.0001011101 | 0.111010 1001111 |
| 94  | 1.0001011110 | 0.111010 1001001 |
| 95  | 1.0001011111 | 0.111010 1000010 |
| 96  | 1.0001100000 | 0.111010 0111011 |
| 97  | 1.0001100001 | 0.111010 0110101 |
| 98  | 1.0001100010 | 0.111010 0101110 |
| 99  | 1.0001100011 | 0.111010 0100111 |
| 100 | 1.0001100100 | 0.111010 0100001 |
| 101 | 1.0001100101 | 0.111010 0011010 |
| 102 | 1.0001100110 | 0.111010 0010011 |
| 103 | 1.0001100111 | 0.111010 0001101 |
| 104 | 1.0001101000 | 0.111010 0000110 |
| 105 | 1.0001101001 | 0.111010 0000000 |
| 106 | 1.0001101010 | 0.1110011111001 |
| 107 | 1.0001101011 | 0.1110011110011 |
| 108 | 1.0001101100 | 0.1110011101100 |
| 109 | 1.0001101101 | 0.1110011100110 |
| 110 | 1.0001101110 | 0.1110011011111 |
| 111 | 1.0001101111 | 0.1110011011000 |
| 112 | 1.0001110000 | 0.1110011010010 |

MATHEMATICAL FUNCTION PROCESSOR UTILIZING TABLE INFORMATION

BACKGROUND OF THE INVENTION

This invention generally relates to mathematical function processing units for data processing. This invention more particularly pertains to a square root processing unit and to a division processing unit.

With a view to achieving high speed computation, the computer industry is continuously trying to provide improved mathematical function processing units. Conventionally, when finding a mathematical function of one or more variables, a part of a value of a certain variable is used as an address to retrieve, from a large-capacity table information store unit, either a function initial value or a numeric value used during the course of calculation whereby high speed computation is accomplished using the retrieved value.

U.S. Pat. No. 5,278,782, granted Jan. 11, 1994 to H. Nakano, shows a square root operation device. This device uses a table information store unit for storing an approximation of the reciprocal of a square root (hereinafter referred to as "ARSQR"). A search through the table information unit is made as follows. When handling a fixed-point number operand, the fixed-point number operand is normalized in units of two bits, and N bits following the head of the normalized operand are used as an address to search through the table information store unit to find an ARSQR. The number N is a plus integer greater than or equal to three. On the other hand, when handling a floating-point number operand with an exponential radix of 2, if an exponent, with bias removed, is odd, a mantissa is shifted to the left too far by one bit place in comparison with an even exponent, and N bits of the resulting mantissa are used as an address to search through the table information store unit to find an ARSQR. This square root operation device further includes a carry look ahead circuit for performing rounding operations on partial square roots, to accomplish high-speed computation. If a portion lower than a least significant bit (LSB) of a partial square root is greater than or equal to a half quantity of that LSB, then rounding-up is automatically done, regardless of the number of times an iterative operation is carried out.

U.S. Pat. No. 5,065,352, granted Nov. 12, 1991 to H. Nakano, discloses a divide apparatus. This divide apparatus has a table information store unit for storing an approximation of the reciprocal of a divisor (hereinafter referred to as "ARD". A fixed-point number operand is converted into an absolute value representation. This converted operand is then bit-normalized and N bits following a most significant bit of the normalized operand are extracted to serve as an address to search through the table information store unit to find an ARD. The number N is a plus integer. When handling a floating-point number operand, a mantissa of an operand is extracted, bit normalization is carried out, and N bits are extracted to serve as an address to search through the table information store unit to find an ARD.

The above-described U.S. Pat. No. 5,278,782 device, however, has some drawbacks. For example, there is a difference in ARSQR precision between a case where top 2 bits of a post-normalization fixed-point number operand are 01 and a case where they are 10 or 11. The former case suffers from lower ARSQR precision than the latter case. Additionally, in the case of the floating-point number operand, a similar problem arises. In other words, there also exists a difference in ARSQR precision between a case where top 2 bits of a mantissa are 01 (i.e., where an exponent, with bias removed, is even) and a case where they are 10 or 11 (i.e., where an exponent, with bias removed, is odd). The former case suffers from lower ARSQR precision than the latter case. Further, regardless of the number of times an iterative calculation is executed, rounding-up is executed if a portion lower than a least significant bit (LSB) of a partial square root is greater than or equal to a half quantity of that LSB. This produces a problem. That is, the position of taking an upper partial square root of a product of a partial remainder by an ARSQR is moved to the left one bit place in each iterative calculation following the first iterative calculation. As a result, a carry propagation bit from the carry look ahead circuit to the rounder/adder for calculating partial square roots is likewise moved to the left one bit place in each iterative calculation following the first iterative calculation. Therefore, the operation of the carry look ahead circuit in the first iterative calculation differs from the operation of the carry look ahead circuit in each iterative calculation following the first iterative calculation.

The above-described U.S. Pat. No. 5,065,352 device has some disadvantages. For example, there is a difference in ARD precision between a case where a head bit of an address lower by one bit place than a most significant bit of a bit-normalized operand is 0 and a case where it is 1. In other words, the former case suffers from lower ARD precision than the latter case.

SUMMARY OF THE INVENTION

It is an object of the present invention to provide improved mathematical function systems such as square root processing units and division processing units having the ability of retrieving, from the table information store unit, numeric values of uniform precision.

It is another object of the present invention to provide an improved square root processing unit that enables the operation of the carry look ahead circuit to remain unchanged throughout all the iterative calculations.

It is still another object of the present invention to provide a table information store unit that requires less storage capacity.

A mathematical function processing unit of the present invention has a table information store unit. This table information store unit has two types of entries, namely one that is accessed by an address having an address length of N bits and the other that is accessed by an address having an address length of (N+1) bits, where the number N is a plus integer, so that numeric values of uniform precision can be retrieved from the table information store unit.

As a result of such arrangement, the table information store unit is accessed by an N-bit address as well as by an (N+1)-bit address so as to uniform the precision of retrieved numeric values. More specifically, in a table information store unit intended for a curve which moves diagonally down to the right and which has a projection underneath (e.g., y=1/√x and y=1/x in a square root processing unit or division processing unit), an address length of (N+1) bits is used for a small address having a head bit of 0, while, on the other hand, an address length of N bits is used for a large address having a head bit of 1. Additionally, in another table information store unit intended for a curve which moves diagonally up to the right and which has a projection underneath, an address length of N bits is used for a small address having a head bit of 0, while, on the other hand, an address length of (N+1) bits is used for a large address having a head bit of 1. If a numeric value cannot be obtained with target precision from a certain entry that is accessed by an N-bit address, the entry is divided into two parts and an address length of (N+1) bits is used for such parts.

The present invention offers a technique to provide greater precision in ARSQR. If a quantity, found by normalizing a fixed-point number operand in units of 2 bits, has 01 as top 2 bits or if a mantissa after an odd-even dependent shift operation (e.g., a shift/through to the left one bit place) has 01 as top 2 bits, the length of address of the table information store unit is made longer by one bit in comparison with a case where such top 2 bits are 10 or 11. Especially, in a square root processing unit used to extract a square root of a floating-point number input operand with an exponential radix of 2, an LSB of an exponent of the input operand signifying whether that LSB is odd or even and N bits from the head of a mantissa of the input operand are added together and the resulting (N+1) bits are used as an address to retrieve an ARSQR from the table information store unit.

A division processing unit of the present invention has a table information store unit that is searched by an address composed of plural bits following a most significant bit of a normalized divisor operand. This table information store unit has an entry that is accessed by an address having an address length of (N+1) bits if a head bit of the plural bits is 0, an entry that is accessed by an address having an address length of N bits if the head bit is 1, and an entry that is accessed by an address having an address length of (N+1) bits if the head bit is 1.

Additionally, in a square root processing unit of the present invention, in order to enable the operation of the carry look ahead circuit to stay unchanged throughout all the iterative calculations, a partial square root, found in the first iterative calculation, is rounded up if a portion lower than an LSB of the partial square root is greater than or equal to a half quantity of the LSB, and a partial square root, found in each iterative calculation following the first one, is rounded up if a portion lower than an LSB of the partial square root is greater than or equal to a quarter of the LSB.

In accordance with a square root processing unit having a carry look ahead circuit for rounding partial square roots, the carry look ahead circuit outputs to a first rounder/adder for calculating a partial square root in anticipation of a carry to $2^{27}$, in the first iterative calculation, while, in each iterative calculation following the first iterative calculation, the carry look ahead circuit outputs to a second rounder/adder for calculating a partial square root in anticipation of a carry to $2^{27}$. In the first rounder/adder, rounding-up is performed if a portion lower than $2^{28}$ is greater than or equal to a half quantity of $2^{28}$. In the second rounder/adder, if a portion lower than $2^{29}$ is greater than or equal to a quarter of $2^{29}$, then rounding-up/addition is performed. In other words, the carry look ahead circuit anticipates only carry to $2^{27}$. This enables the operation of the carry look ahead circuit to remain unchanged throughout all the iterative calculations.

In a mathematical function processing unit according to the present invention, to provide a table information store unit that requires a less storage capacity, plural numeric value data are divided into upper bits and lower bits. Only some of the upper bits that differ from one another are stored.

In accordance with the above-described mathematical function processing unit of the present invention, whereas the lower bits are retrieved, in a conventional way, in accordance with the results obtained by decoding an address given, the upper bits are retrieved in accordance with the results obtained by encoding the address decoding results. This reduces the number of entries of an upper memory thereby providing a table information store unit that does not require a large storage capacity.

BRIEF DESCRIPTION OF THE DRAWINGS

Preferred embodiments of the present invention will now be described by reference to the accompanying drawings wherein:

FIG. 3 shows a Booth's algorithm in the FIG. 2 multiplying circuit;

FIGS. 4A and 4B show outputs of structural elements of FIG. 1 in the form of numeric values;

FIG. 5A illustrates the operation of rounding/addition in the first iterative calculation in the FIG. 2 multiplying circuit and FIG. 5B illustrates the operation of rounding/addition in each iterative calculation following the first iterative calculation in the same multiplying circuit;

FIGS. 6A and 6B are compare examples with FIGS. 5A and 5B;

FIG. 13 is a block diagram of a table information store unit of FIG. 12;

FIG. 15 shows a first process of arithmetic operation execution by the FIG. 12 division processing unit;

FIG. 21 illustrates the effect of reduction in the number of entries in the FIG. 12 table information store unit;

FIG. 24 is a diagram showing specified values at extreme points of line segments of FIG. 20 when assuming that an approximate reciprocal ROM is accessed only by an address having an address length of 9 bits if an address head bit is 1;

FIG. 25 is a diagram showing specified values at extreme points of line segments of FIG. 20 when an approximate reciprocal ROM is partly accessed by an address having an address length of 10 bits if an address head bit is 1;

FIG. 27 is a truth table for S-input decoders of FIG. 26;

FIG. 29 partly shows the relationship of the address given to the FIG. 13 approximate reciprocal ROM versus the ARD read out of the FIG. 13 approximate reciprocal ROM;

FIG. 30 is a continuation of FIG. 29; and

DETAILED DESCRIPTION OF THE INVENTION

Figure 1:
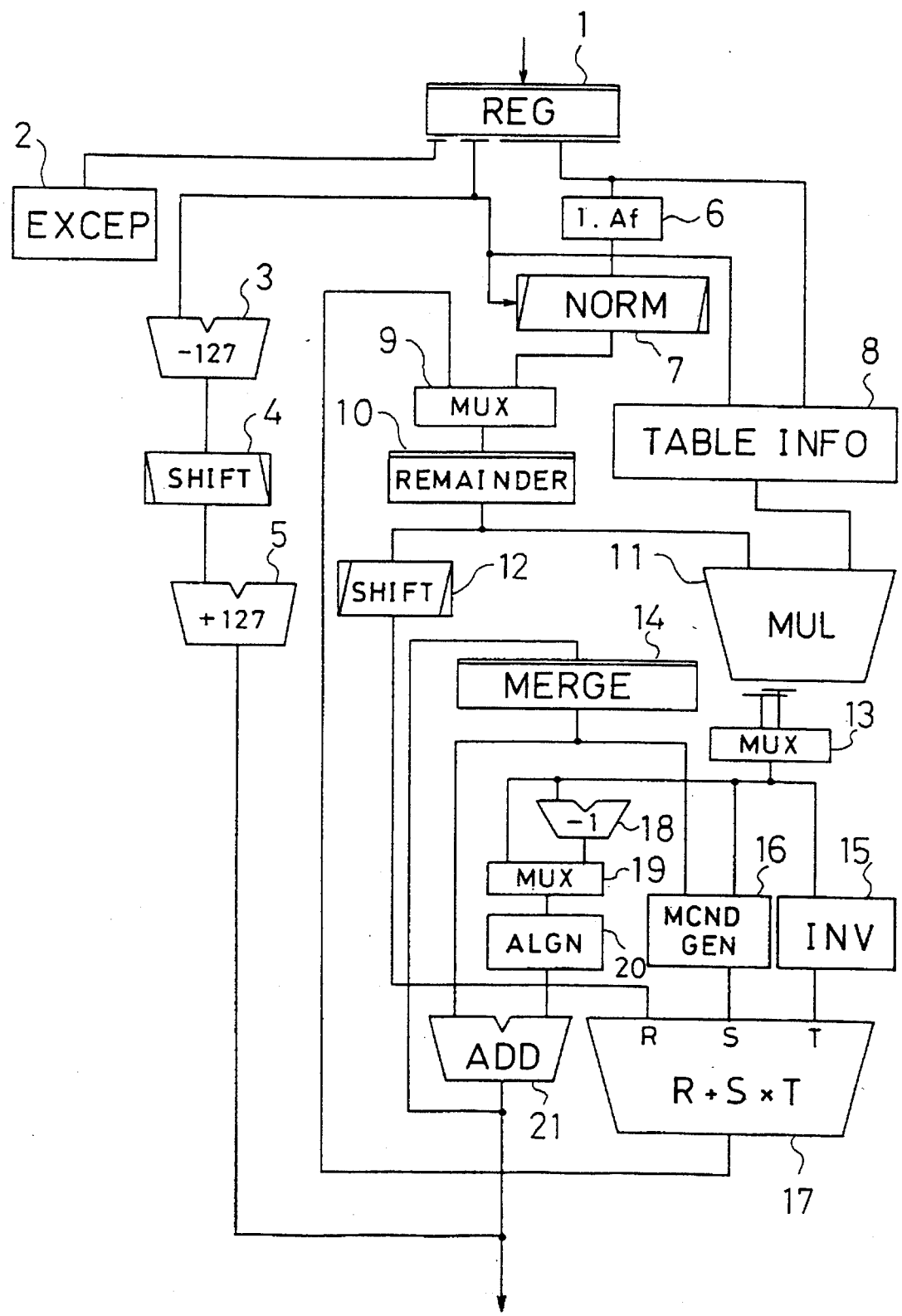
FIG. 1 is a block diagram of a floating-point square root processing unit according to the present invention.

Preferred embodiments of the present invention will now be described below.

In the first place, the relationship between the ARSQR and the square root operation convergence is discussed. This relationship is detailed in the previously mentioned U.S. Pat. No. 5,278,782. A radicand A, normalized in units of 2 bits, satisfies the following mathematical expression (A1).

$$2^{-2} \leq A < 1 \quad (A1)$$

$\sqrt{A}$ is divided into groups, each group being composed of n bits, in the order of significance (mathematical expression (A2)). $a_{ij}$ is a 0 or 1. Especially, $a_{11}$ is a 1 from mathematical expression (A1).

$$\sqrt{A}=a_1+a_2+a_3+a_4+a_5+(a_i=2^{-in}(a_{i1}\cdot 2^{n-1}+a_{i2}\cdot 2^{n-2}+\ldots+a_{in}\cdot 2^0)) \quad (A2)$$

The left- and right-hand sides of mathematical expression (A2) are squared. The result is mathematical expression (A3).

$$A=(a_1+a_2+a_3+a_4+a_5+\ldots)^2 \quad (A3)$$

Suppose an ARSQR of A is M and the precision of M satisfies the following mathematical expression (A4).

$$|\sqrt{A}\cdot M - 1| \leq 2^{-(n+1)} \quad (A4)$$

$\sqrt{A}$ can be found by the following procedure, and mathematical expression (A4) is a sufficient condition to find partial square roots each of which is made up of n bits.

(1) A ($=R_0$) is multiplied by M, and n bits in series from the high order of the result found are taken to serve as $b_1$.

(2) $R_0 - b_1 \times b_1$ is performed to find $R_1$, and $R_1$ is left-shifted n bit places.

Then the following (3) and (4) are repeated a required number of times.

(3) $R_i$ is multiplied by M, and (n+1) bits in series from the high order of the result found are taken to serve as $b_{i+1}$. However, it is to be noted that $b_{i+1}$ is taken out from a position one bit place higher as compared with $b_1$ of (1) and that, to make a correction to $b_i$, one extra bit is taken out for a higher upper position.

(4) $R_i - \{(b_1+\ldots+b_i) \times 2 + b_{i+1}\} \times b_{i+1}$ is performed to obtain $R_{i+1}$. This $R_{i+1}$ is likewise left-shifted n bit places.

U.S. Pat. No. 5,278,782 shows that the fact that $\sqrt{A}$ can be found by the above-described procedure can be proved by the fact that the following theory T holds.

(Theory T)

If a sum of $b_1+b_2+\ldots+b_i$ is compared with a sum of $a_1+a_2+\ldots+a_i$, then the result of such a comparison has three alternatives, that is, (i) the former sum is equal to the latter sum, (ii) the former sum is greater than the latter sum by $2^{-in}$, or (iii) the former sum is lower than the latter sum by $2^{-in}$.

It is to be noted that the following descriptions will be made by limiting the subject of the present invention to a square root operation performed on floating-point numbers. Also note that the radicand A will be processed within a range of mathematical expression (A5) which is obtained from mathematical expression (A1) when the binary point is shifted to the right two bit places, in order that a square root found is aligned with the binary point of a mantissa of an IEEE floating-point number. The processing of fixed-point numbers can be deduced from the following explanation as to the processing of floating-point numbers.

$$1 \leq A < 2^2 \quad (A5)$$

U.S. Pat. No. 5,278,782 shows that if an address, used to retrieve an ARSQR, is 12 bits, this causes an address length when top 2 bits of a mantissa are 01, an address length when they are 10, and an address length when they are 11 to be identical with one another, as shown in mathematical expression (A6).

$$0\ 1.\ x\ x\ x\ x\ x\ x\ x\ x\ x\ x\ 1\ x.\ x\ x\ x\ x\ x\ x\ x\ x\ x\ x \quad (A6)$$

Note: x represents either 0 or 1.

Conversely, in accordance with the present invention, as shown in mathematical expression (A7), if the top 2 bits are 01, one bit is extra taken out compared with a case when the top 2 bits are 10 or 11. As a result, the precision of ARSQR obtained when the exponent is even becomes identical with the precision of ARSQR obtained when the exponent is odd.

$$0\ 1.\ x\ x\ x\ x\ x\ x\ x\ x\ x\ x\ y\ 1\ x.\ x\ x\ x\ x\ x\ x\ x\ x\ x \quad (A7)$$

Note: "x" represents either 0 or 1. Also "y" represents either 0 or 1.

If the top 2 bits are 01, a quantity, shown in mathematical expression (A8), may be used as an address to retrieve an ARSQR from the table information store unit. Mathematical expression (A8) results from replacing the second bit (i.e., 1) with "y" of the "0 1. x x x x x x x x x x y" of mathematical expression (A7).

$$0\ y\ x\ x\ x\ x\ x\ x\ x\ x\ x\ x\ 1\ x\ x\ x\ x\ x\ x\ x\ x\ x\ x \quad (A8)$$

For a floating-point number with an exponential radix of 2, if an exponent, with bias removed, is shifted to the right one bit place, the square root of the exponent becomes a resultant exponent before the bias is applied. If the shifting of an exponent to the right one bit place causes no loss of 1, or if an exponent, with bias removed, is even, then a mantissa is not shifted. If the shifting of an exponent to the right one bit place involves loss of 1, or if an exponent, with bias removed, is odd, then a mantissa is left-shifted one bit place in order not to change a numeric value. A form, which is expressed by mathematical expression (A7) and which is one before shifting, becomes mathematical expression (A9), and an address for the table information store unit is 12 bits made up of a fraction part off 11 bits and an LSB of the exponent part that signifies whether the exponent is odd or even. The present invention also uses this relationship.

$$0\ 1.\ x\ x\ x\ x\ x\ x\ x\ x\ x\ x\ y\ 0\ 1.\ x\ x\ x\ x\ x\ x\ x\ x\ x\ x\ x \quad (A9)$$

Further, in accordance with U.S. Pat. No. 5,278,782, the carry look ahead circuit predicts a carry to $2^{27}$ and outputs the predicted carry to the first rounder/adder in the first iterative calculation. In the following iterative calculations, the carry look ahead circuit predicts a carry to $2^{28}$ and outputs the predicted carry to the second rounder/adder. The first rounder/adder performs rounding-up/addition if a portion lower than $2^{28}$ is greater than or equal to a half quantity of $2^{28}$. On the other hand, the second rounder/adder performs a rounding-up/addition if a portion lower than $2^{29}$ is greater than or equal to a half quantity of $2^{29}$. This means that the carry look ahead circuit must predicts a carry to $2^{27}$ as well as a carry to $2^{28}$.

Conversely, in accordance with the present invention, if a portion lower than an LSB of a partial square root found in the first iterative computation is found to be greater than or equal to a half quantity of that LSB, then rounding-up is carried out. If a portion lower than an LSB of a partial square root found in each of the following iterative computations is found to be greater than or equal to a quarter of that LSB, then rounding-up is carried out. This relieves the carry look ahead circuit of burdens, that is to say, the carry look ahead circuit is only required to look ahead a carry to $2^{27}$. This allows the operation of the carry look ahead circuit to remain unchanged throughout all the iterative calculations.

Two different floating-point square root processing units according to the present invention are described. First, features in common between them are illustrated.

In the embodiment, a numeric value to be stored into the table information store unit, as a reciprocal square root, is chosen within a range that satisfies n=12 in mathematical expression (A4). The precision of ARSQR was confirmed using a computing machine. The confirmation method is described below.

Figure 9:
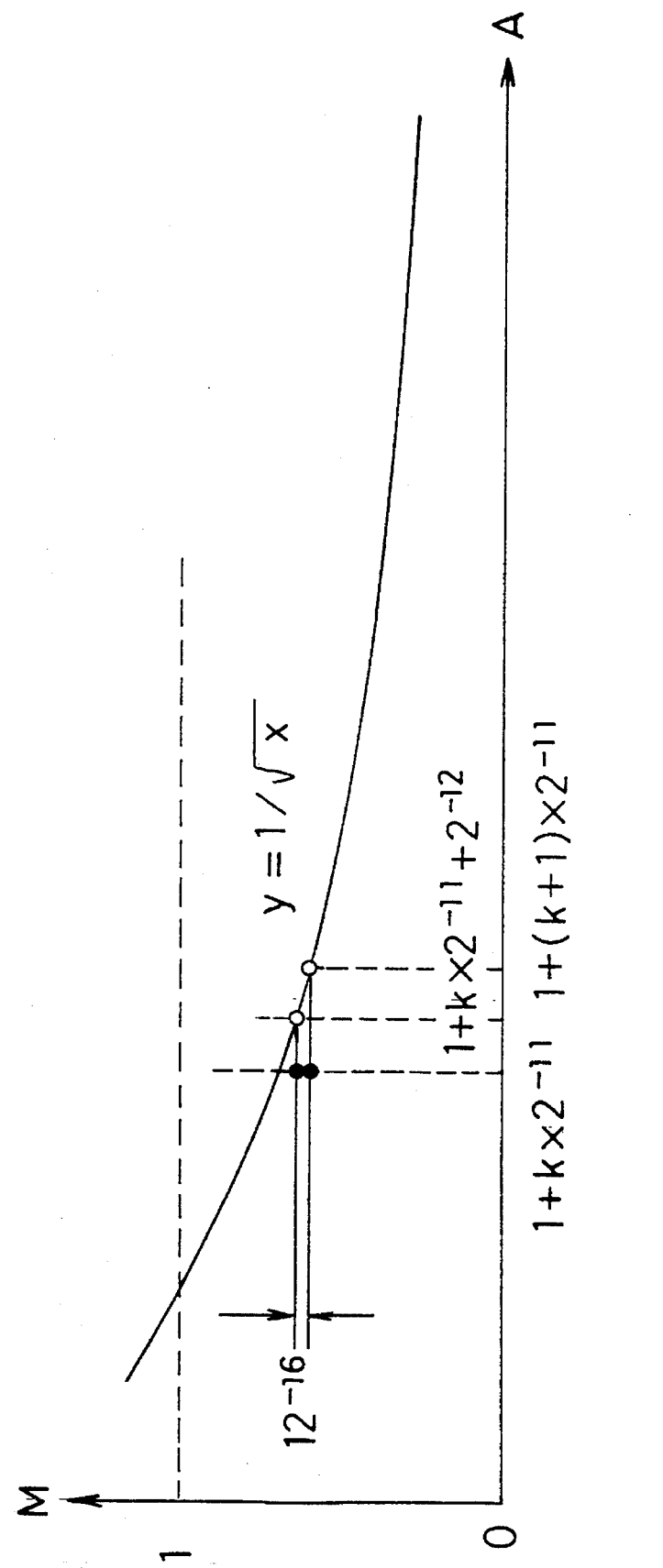
FIG. 9 is a descriptive diagram to illustrate the improvement in M (i,e., ARSQR)
Figure 10:
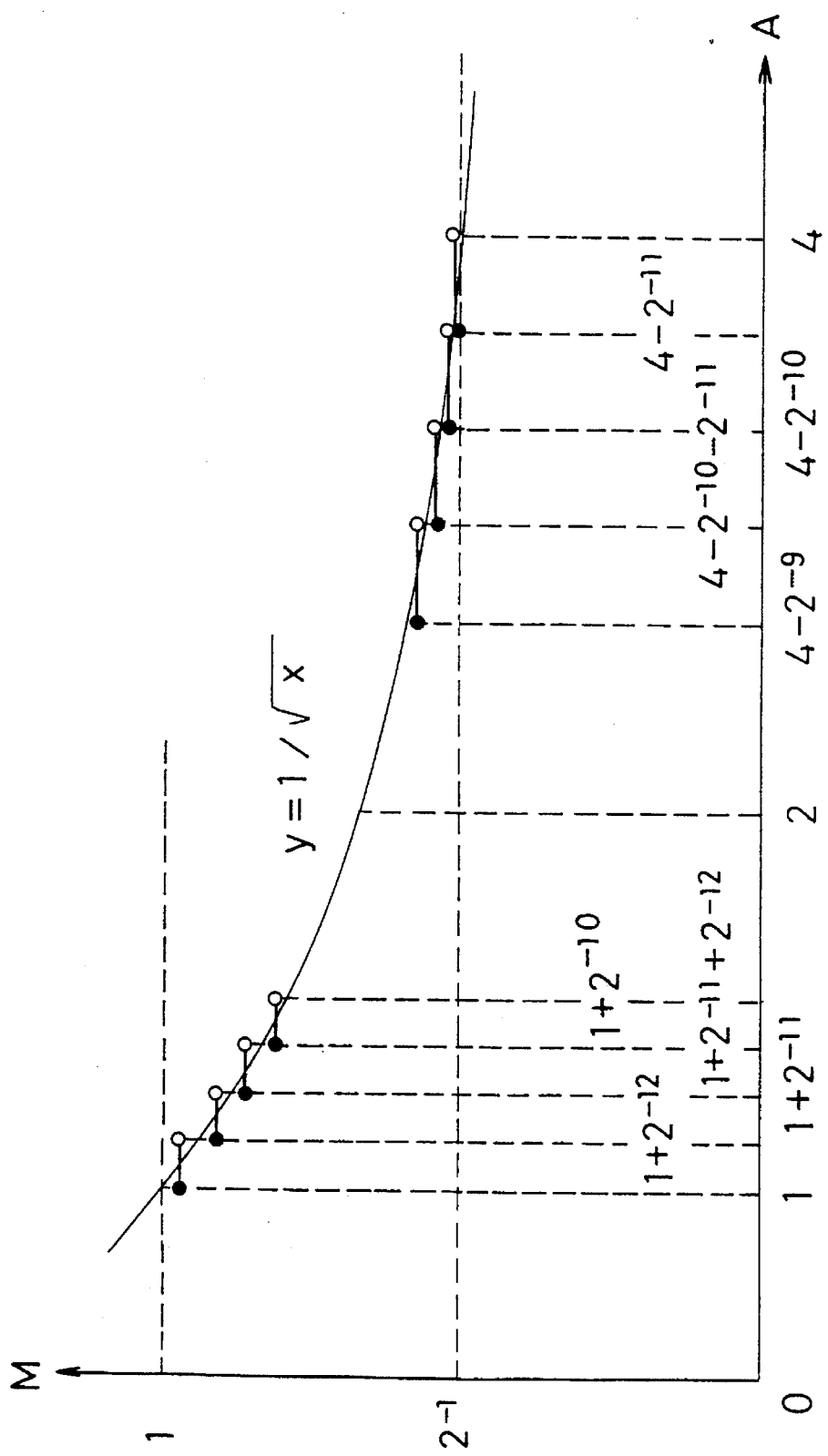
FIG. 10 shows the relationship of A (i.e., radicand) versus M.
Figure 11:
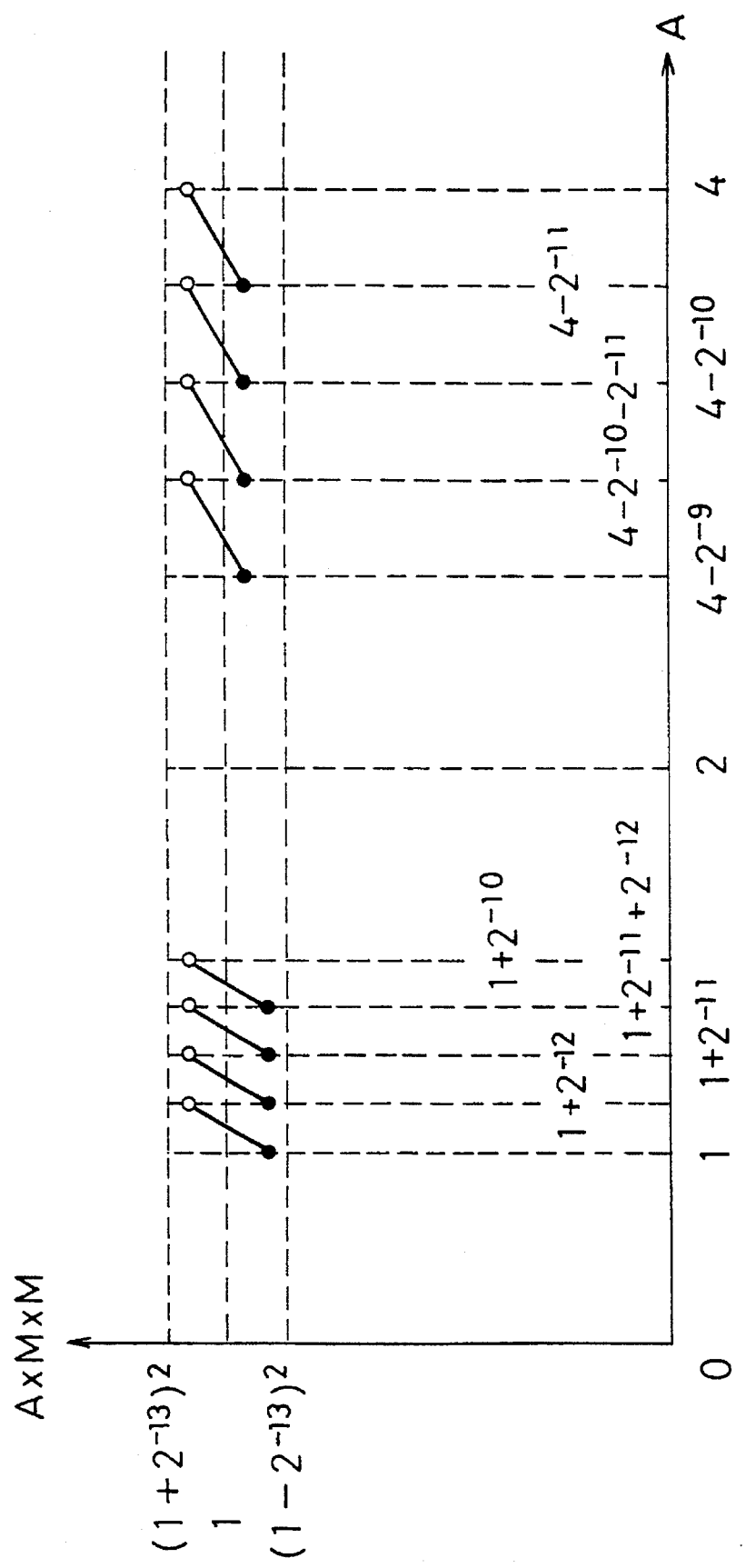
FIG. 11 shows the relationship of A versus A×M×M.

M is a constant in $[1+k\times 2^{-11}, 1+(k+1)\times 2^{-11}]$ as a result of dividing the range [1,2) into 2048 equal divisions (k=0, 1, . . ., 2047). Further, M is a constant in $[2+k\times 20^{-10}, 2+(k+1)\times 2^{-10}]$ as a result of dividing the range [2,4) into 2048 equal divisions (k=0, 1, . . . , 2047). Additionally, to obtain more precise ARSQR, $2^{-16}$ is added to an output value of the table information store unit using a technique if $2^{-12}$ or $2^{-11}$ which is lower by one bit place than a radicand LSB which is used as an address to search through the table information store unit, is zero. This can be considered by making use of a graph of FIG. 9. As shown in FIG. 9, y=1/√x is a curve that moves diagonally down to the right. This means that, in the first half of $[1+k\times 2^{-11}, 1+(k+1)\times 2^{-11}]$ or in the first half of $[2+k\times 2^{-10}, 2+(k+1)\times 2^{-10}]$, the value of the ARSQR is increased by $2^{-16}$. Therefore, a graph, as a result of dividing the range [1, 2] or [2,4] into 4096 equal divisions to show the relationship between A and M, is a step function graph of FIG. 10. On the other hand, an A×M×M graph, as shown in FIG. 11, takes a sawtooth shape formed by 8192 line segments. The precision of ARSQR obtained is shown below (hexadecimal notation).

Maximum 1. 006→1. 000FD4462
Minimum 1. 000→0. FFF0004

These values shown above each satisfy the following mathematical expression (A10) that is obtained by performing formula transformation in mathematical expression (A4), taking n=12 and by squaring both sides of the expression.

$$(1-0.0008)^2=0.\ FFF0004 \leq A\times M\times M \leq (1+0.0008)^2=1.0010004 (A10)$$

When the range [1,4) is divided into 6144 equal divisions, or when the range [1,2) is divided into 2048 equal divisions, U.S. Pat. No. 5,278,782 provides the following poorer precision than the above.

Maximum 1. 004→1. 001FD9048
Minimum 1. 000→0. FFE0001

Although digits from $2^{-2}$ to $2^{-16}$ of a reciprocal square root are stored into the table information store unit, neither a sign bit that is always 0 nor a $2^{-1}$ bit that is always 1 is not stored into the table information store unit. For the sake of simplicity, the following description will be made as if these two bits, 01, are stored in the table information store unit. In the process of a multiplication operation, a multiplier is divided into groups each composed of 3 bits with a 1-bit overlap so as to generate multiples of a multiplicand in accordance with the Booth's algorithm as shown in FIG. 3, and a partial carry and a partial sum, found by a carry save adder (CSA) array in a tree form, are summed together to find a final product. When performing a multiplication operation of a remainder by an ARSQR, a 1 is added to the head of a value read out of the table information store unit and the inverse of an adjacent bit on the right side of a bit used as an address is added to the tail. In the multiplication operation, if such a bit added on the right side is served as an LSB of a multiplier, this provides a $2^{-16}$-fold effect rather than a $2^{-17}$-fold effect.

In an (R–S×T) operation which is described later, R, as some sort of multiple with respect to a multiplying circuit, is fed to the CSA array. Additionally, to make an {R+S×(–T)} operation, a one's complement of a multiple input is taken. 1, as an LSB, is added thereby providing the same effect as described above. As a result, a multiplier is so arranged as to become a two's complement number in an (R+S×T) arithmetic unit. It is well known in the art that, if a sign bit is appropriately extended upward, this permits multiplication to be performed even on minus numbers in the two's complement representation.

Each preferred embodiment of the present invention uses specified numeric values which are represented in the hexadecimal representation unless noted otherwise.

FIG. 1 schematically shows a floating-point square root processing unit according to a preferred embodiment of the present invention. Note that a floating-point square root processing unit, described in the present embodiment, is a system capable of receiving a single precision floating-point number to the IEEE standard and of providing a square root of that IEEE floating-point number. The bit length, as partial square root data, is 13 bits and there is a 1-bit overlap between each partial square root.

The present square root processing unit comprises these components: input register 1, exception detector 2, exponent constant subtracter (ECS) 3, shifter 4, exponent constant adder (ECA) 5, leading bit adding circuit (LBAC) 6, normalization circuit 7, table information store unit (TISU) 8, multiplexer 9, remainder hold circuit (RHC) 10, multiplying circuit 11, shifter 12, multiplexer 13, merged square root hold circuit (MSRHC) 14, inverter 15, multiplicand generator 16, (R+S×T) arithmetic unit 17, constant subtracter 18, multiplexer 19, digit place alignment circuit (DPAC) 20, and adder 21.

The operation of the FIG. 1 floating-point square root processing unit is explained using specific numeric values. FIG. 4 shows how an input operand is processed by each means. An operand, 3481E01B, is input and is set in input register 1. If the input operand is minus, such is detected by exception detector 2 as a data exception. In such a case, exception detector 2 issues, to an instruction execution control section provided outside the floating-point square root processing unit (not shown), a message informing that such a data exception is now taking place. However, in the present embodiment, exception detector 2 detects no data exceptions, since the input operand is plus. A bias value, 7F, is subtracted by ECS 3 from the exponent of $2^{30}$ to $2^{23}$ of input register 1 output. Then, the exponent is shifted by shifter 4 to the right one bit place. Thereafter, 7F is added to the exponent by ECA 5 to find a resultant exponent. LBAC 6 adds a 1, as a leading bit, to the mantissa of $2^{22}$ to $2^0$ of input register 1 output. Normalization circuit 7 performs no shift operations on input if $2^{23}$ of input register 1 output is a 1 (i.e., if an exponent, with a bias removed, is even). On the other hand, if $2^{23}$ of input register 1 output is a 0 (i.e., if an exponent, with a bias removed, is odd), this causes normalization circuit 7 to shift an input to the left one bit place and the shifted input is provided. 12 bits ($2^{23}$ to $2^{12}$ of input register 1 output) are fed to TISU 8. In response, TISU 8 outputs 0FE1D. The inverse of a $2^{11}$ bit of input register 1 output is added to act as an LSB of this output, 0FE1D. More specifically, in the present embodiment, a 1 is added. Multiplying circuit 11 uses 0FE1E as a practical multiplier. Multiplexer 9 selects an output of normalization circuit 7. This selected output is set in RHC 10, and MSRHC 14 is reset to zero. Multiplying circuit 11 performs multiplication of 081E01B by 0FE1E, whereby a product, 080EB930D2A, is found. In the first iteration, if a portion lower than $2^{28}$ is greater than or equal to a half quantity of $2^{28}$, rounding-up is performed and the result is provided to multiplexer 13 In a second iteration, if a portion lower than $2^{29}$ is greater than or equal to a quarter of $2^{29}$ rounding-up is performed and the result is provided to multiplexer 13.

Figure 2:
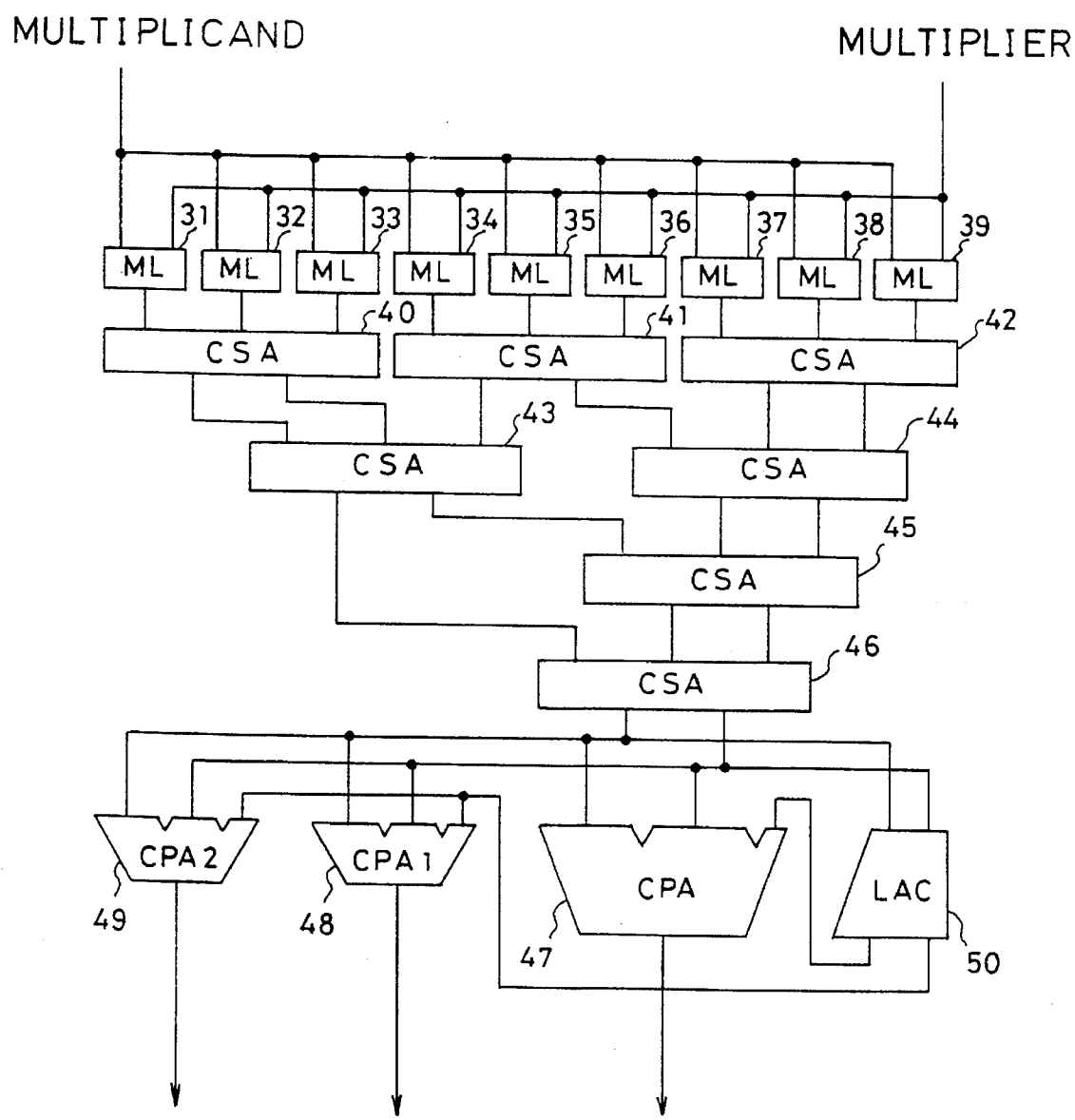
FIG. 2 is a block diagram of a multiplying circuit of FIG. 1.

An example of multiplying circuit 11 is shown in FIG. 2. Depicted in FIG. 2 are multiple generators (MLs) 31–39, carry save adders (CSAs) 40–46, carry propagation adder (CPA) 47, first partial square root rounder/adder (CPA1) 48, second partial square root rounder/adder (CPA2) 49, and carry look ahead circuit (LAC) 50.

Each ML 31–39 is provided with a multiplicand. Each ML 31–39 is also provided with a multiplier composed of three bits of which one bit overlaps with an adjacent ML. As a result, MLs 31–39 generate multiples of multiplicands as shown in FIG. 3. MLs 31–39 give their outputs to corresponding CSAs 40–42 (see FIG. 2). Each CSA 40–42 performs a carry save addition on a respective input. The outputs of CSAs 40–42 are finally brought by CSAs 43–46 to a partial carry and a partial sum. The bits of $2^{43}$ to $2^0$, $2^{41}$ to $2^{27}$, and $2^{42}$ to $2^{27}$ of the partial carry and the partial sum, output by CSA 46, are fed to CPA 47 and LAC 50, to CPA1 48, and to CPA2 49, respectively. LAC 50 predicts a carry to $2^{27}$ to output to CPA1 48 and CPA2 49. If a portion lower than $2^{28}$ is greater than or equal to a half quantity of $2^{28}$ CPA1 48 performs a rounding up operation and then a rounding/addition operation. As a result, 14 bits ($2^{41}$ to $2^{28}$), composed of a sign bit and 13-bit data, are output as a partial square root. If a portion lower than $2^{29}$ is greater than or equal to a quarter of $2^{29}$ CPA2 49 performs a rounding up operation. As a result, 14 bits ($2^{42}$ to $2^{29}$), composed of a sign bit and 13-bit data, are output as a partial square root.

Referring now to FIGS. 5A–B, rounding/addition by LAC 50, CPA1 48, and CPA2 49 is explained. It is sufficient for LAC 50 to predict only a carry to $2^{27}$ to output to CPA1 48 and CPA2 49.

For the purpose of comparison, rounding/addition by the U.S. Pat. No. 5,278,782 square root operation device is discussed by making reference to FIGS. 6A–B. In accordance with U.S. Pat. No. 5,278,782, the carry look ahead circuit (LAC) predicts a carry to $2^{27}$ to output to the first partial square root rounder/adder (CPA1) while, on the other hand, the carry look ahead circuit (LAC) predicts a carry to $2^{28}$ to output to a second partial square root rounder/adder (CPA2). The first partial square root rounder/adder (CPA1) performs rounding-up if a portion lower than $2^{28}$ is greater than or equal to a half quantity of $2^{28}$. The second partial square root rounder/adder (CPA2) performs rounding-up if a portion lower than $2^{29}$ is greater than or equal to a half quantity of $2^{29}$. This means that the carry look ahead circuit (LAC) must anticipate two different carries.

Multiplexer 13 of FIG. 1 selects 14 bits ($2^{41}$ to $2^{28}$) from multiplying circuit 11 as a first partial square root composed of a sign bit and 13-bit data. This first partial square root has a plus sign and a head bit of the 13-bit data is zero. Upon receiving the partial square root, inverter 15 bit-inverts the received partial square root, adds a 1 to an LSB thereof, and outputs the result. In the first iteration, multiplicand generator 16 selects 14 bits provided from multiplexer 13 as $2^{26}$ to $2^{13}$ while at the same time outputting all the other remaining bits as zeros. (R+S×T) arithmetic unit 17 receives R, S, and T to perform an (R+S×T) operation, where R is shifter 12 output obtained by shifting RHC 10 output to the left 12 bit places, S is multiplicand generator 16 output, and T is inverter 15 output. (R+S×T) arithmetic unit 17 outputs FFE59000. This FFE59000 is then selected by multiplexer 9 and is set in RHC 10. Constant subtracter 18 subtracts 1 from an LSB of an output of multiplexer 13. Multiplexer 19 selects an output of constant subtracter 18 if (R+S×T) arithmetic unit 17 gives a minus output, otherwise multiplexer 19 selects multiplexer 13 output. In the first iteration, multiplexer 19 selects constant subtracter 18 output because of the above-described conditions. DPAC 20 performs a digit place alignment operation in order to merge partial square roots found in each iteration. More specifically, if a partial square root is minus, top 2 bits of an output of multiplexer 19 composed of 14 bits are forced to zeros. If a partial square root is plus, then a shift operation is carried out in order to match the 14-bits of the output of multiplexer 19 with upper merged square roots in bit weight and the result of the shift operation is provided. With respect to a first partial square root, input data is aligned within the $2^{25}$ to $2^{12}$ bit range and is provided. Adder 21 receives outputs of MSRHC 14 and DPAC 20, thereby performing addition of these outputs. The result of the addition operation is set in MSRHC 14.

Then, the process of the floating-point square root processing unit enters a second iteration calculation state. In the second iteration, TISU 8 gives the same output as the first iteration. A first remainder $R_1$ set in RHC 10, FFE59000, is multiplied by 0FE1E in multiplying circuit 11 to provide a product, FESC1C6E000. Multiplexer 13 selects 3F2E ($2^{42}$ to $2^{29}$) as a second partial square root composed of a sign bit and 13-bit data. 3F2E is inverted by inverter 15 to be 00D1. 00D1 is provided with a 1 as an LSB and is output. (R+S×T) arithmetic unit 17 performs an arithmetic operation using 00D2 as a practical multiplier. Meanwhile, multiplicand generator 16 selects $2^{25}$ to $2^{12}$ of an output of MSRHC 14 as $2^{27}$ to $2^{14}$ and selects 13 bits excluding a head bit of a 14-bit output of multiplexer 13 as $2^{13}$ to $2^{1}$. Thereafter, multiplicand generator 16 provides 208BE5C. (R+S×T) arithmetic unit 17 receives R, S, and T to perform an (R+S×T) operation, where R is shifter 12 output obtained by shifting RHC 10 output to the left 12 bit places, S is multiplicand generator 16 output, and T is inverter 15 output. 00122778, an output of (R+S×T) arithmetic unit 17, is selected by multiplexer 9 and is set in RHC 10. Multiplexer 19 selects an output of multiplexer 13 and provides the selected output. DPAC 20 forces top 2 bits of the 14 bits to zeros and arranges the remaining 12 bits in the $2^{11}$ to $2^{0}$ bit range. Adder 21 adds an output of MSRHC 14 and an output of DPAC 20 to provide 80EF2E. Adder 21 output is set in MSRHC 14.

A 0, 8 bits provided by ECA 5, and $2^{22}$ to $2^{0}$ of adder 21 output are selected as a sign bit for $2^{31}$, as a resultant exponent of $2^{30}$ to $2^{23}$, and as a resultant mantissa of $2^{22}$ to $2^{0}$, respectively, and a final result is provided from the square root processing unit of FIG. 1 in the form of 3A00EF2E.

In accordance with the present square root processing unit, the least significant bit of the exponent and the upper 11 bits of tile mantissa are used as an address to retrieve an ARSQR from TISU 8. This not only reduces the amount of hardware required to construct TISU 8 but also provides a high-performance square root processing unit.

Figure 7:
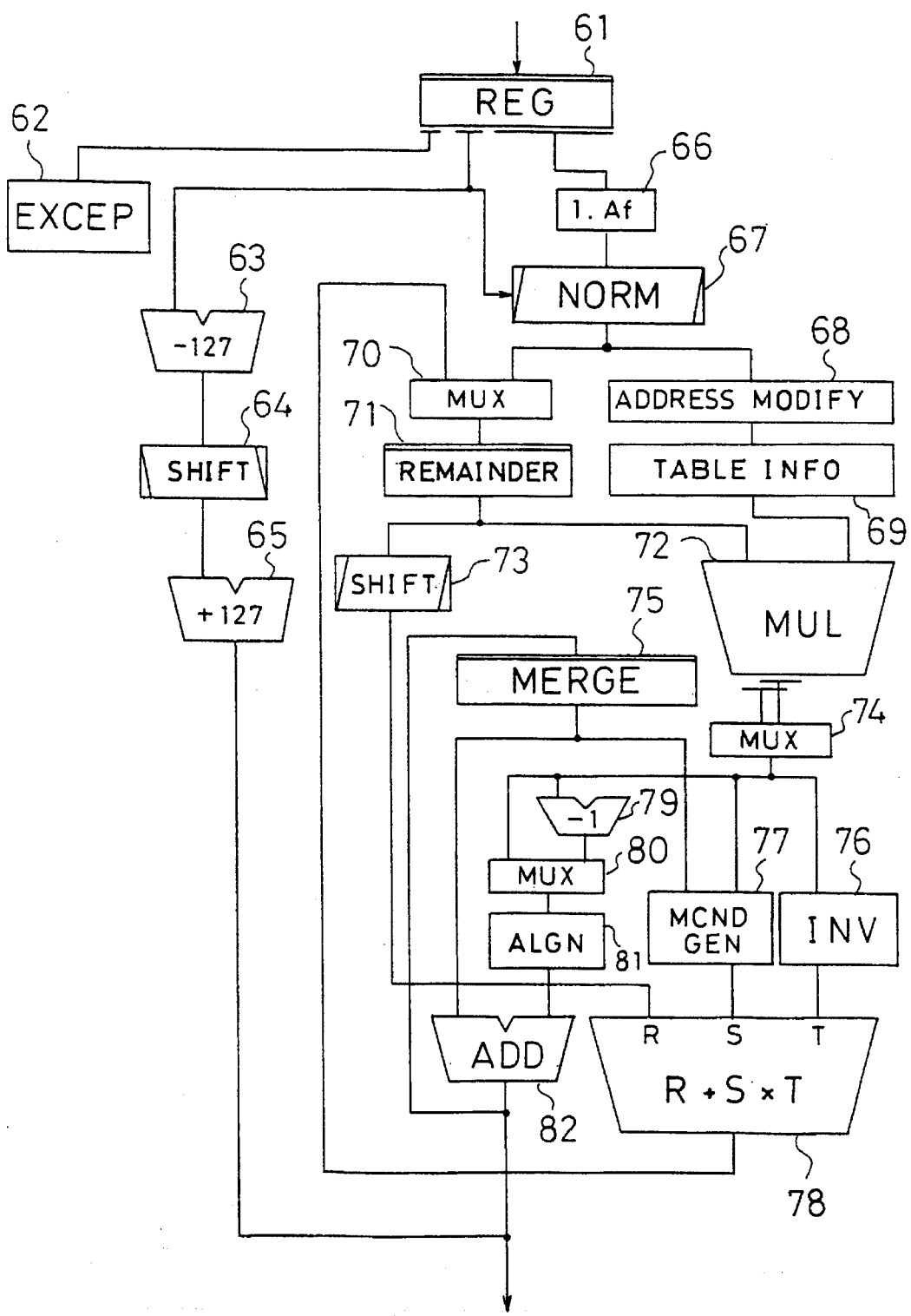
FIG. 7 is a block diagram of another floating-point square root processing unit according to the present invention.

FIG. 7 schematically shows a floating-point square root processing unit according to a preferred embodiment of the present invention. Note that a floating-point square root processing unit, described in the present embodiment, is a system capable of receiving a single precision floating-point number to the IEEE standard and of providing a square root of that IEEE floating-point number. The bit length, as partial square root data, is 13 bits, and there is a 1-bit overlap between each partial square root.

Shown in FIG. 7 are input register 61, exception detector 62, exponent constant subtracter (ECS) 63, shifter 64, exponent constant adder (ECA) 65, leading bit adding circuit (LBAC) 66, normalization circuit 67, address modifier 68, table information store unit (TISU) 69, multiplexer 70, remainder hold circuit (RHC) 71, multiplying circuit 72, shifter 73, multiplexer 74, merged square root hold circuit (MSRHC) 75, inverter 76, multiplicand generator 77, (R+S×T) arithmetic unit 78, constant subtracter 79, multiplexer 80, digit place alignment circuit (DPAC) 81, and adder 82.

Figure 4B:
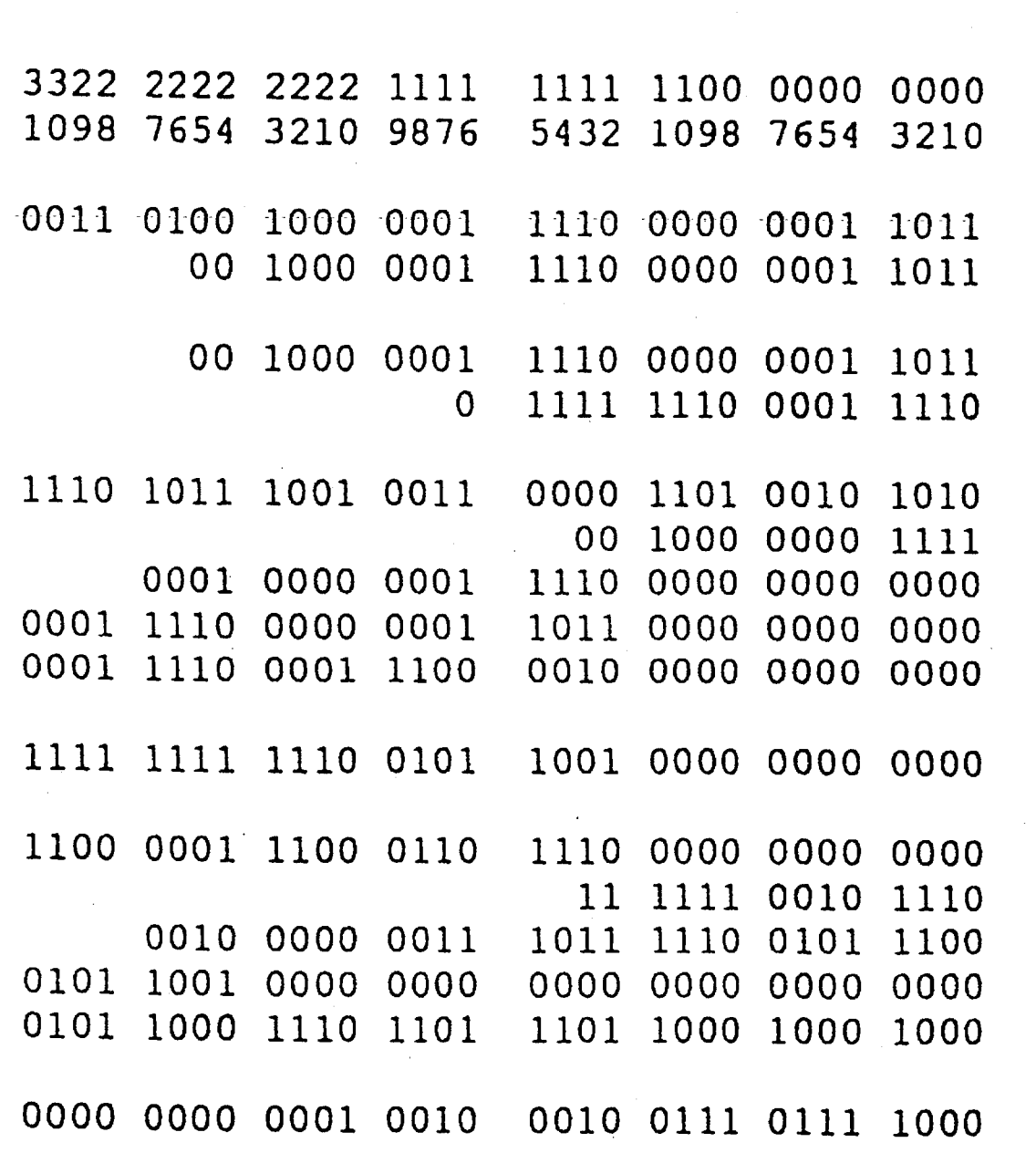

The operation of the FIG. 7 floating-point square root processing unit is explained using specific numeric values. FIGS. 4A–B show how an input operand is processed by each means. An operand, 3481E01B, is input and is set in input register 61. If the input operand is minus, this is detected by exception detector 62 as a data exception. In such a case, exception detector 62 issues, to an instruction execution control section provided outside the floating-point square root processing unit (not shown), a message informing that such a data exception is now taking place. However, in the present embodiment, exception detector 62 detects no data exceptions, since the input operand is plus. A bias value, 7F, is subtracted by ECS 3 from the exponent of $2^{30}$ to $2^{23}$ of input register 61 output. Then, the exponent is shifted by shifter 64 to the right one bit place. Thereafter, 7F is added to the exponent by ECA 65 to find a resultant exponent.

LBAC 66 adds a 1, as a leading bit, to the mantissa of $2^{22}$ to $2^{0}$ of input register 1 output. Normalization circuit 67 performs no shift operations on input if $2^{23}$ of input register 61 output is 1 (i.e., if an exponent, with a bias removed, is even). On the other hand, if $2^{23}$ of input register 61 output is 0 (i.e., if an exponent, with a bias removed, is odd), this causes normalization circuit 67 to shift an input to the left one bit place and the shifted input is provided. Address modifier 68 receives top 14 bits of an output of normalization circuit 67 (i.e., X1, X2, . . .,X14), thereby providing a 12-bit address to TISU 69 and a bit next to the address that is lower by one bit than an LSB of the address.

Figure 8:
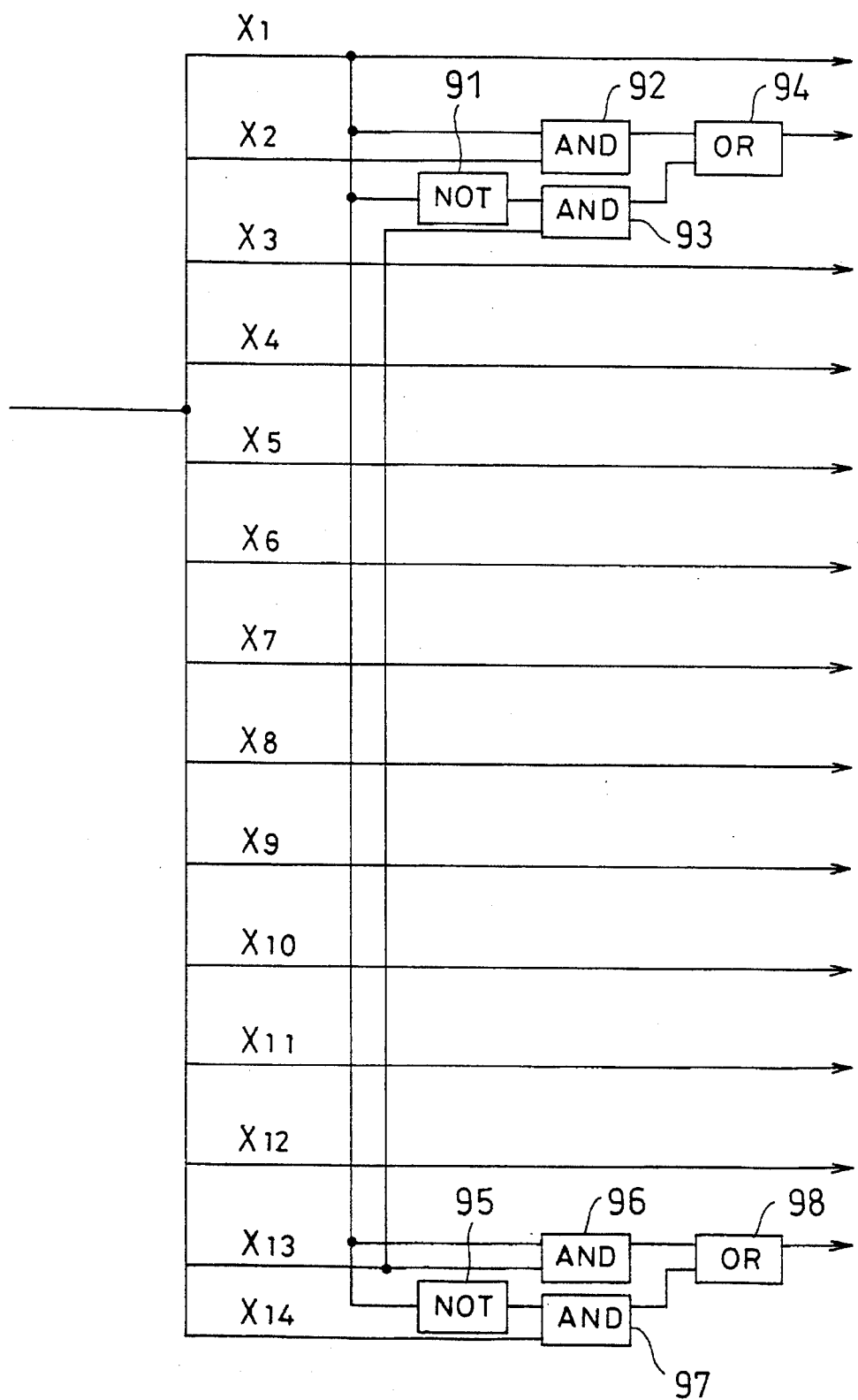
FIG. 8 is a block diagram of an address modification unit of FIG. 7.

FIG. 8 shows an example of address modifier 68. This example has two inverters (NOT) 91 and 95, four AND circuits 92, 93, 96, and 97, and two OR circuits 94 and 98. If X1=1, address modifier 68 selects X2 as a second bit of an address, and If X1=0, X13 is selected. Additionally, if X1=1, X13 is selected as an adjacent bit to an address, and if X1=0, X14 is selected. The operation of address modifier 68 corresponds to the transformation of mathematical expression (A7) into mathematical expression (A8).

Address modifier 68 provides TISU 69 with a 12-bit address. In response, TISU 69 provides 0FE1D. As an LSB of this 0FE1D, an inverse of an adjacent bit to the address provided by address modifier 68 is added. In the case of the present embodiment, a 1 is added, and multiplying circuit 72 uses 0FE1E as a practical multiplier. Multiplexer 70 selects normalization circuit 67 output, and this output is set in RHC 71. At this point in time, MSRHC 75 is reset to zero. Multiplying circuit 72 multiplies 081E01B by 0FE1E to produce a product, 080EB980D2A. If, in the first iteration, a portion lower than $2^{28}$ is greater than or equal to a half quantity of $2^{28}$ rounding-up is performed and the result is fed to multiplexer 74. If, in the second iteration, a portion lower than $2^{29}$ is greater than or equal to a quarter of $2^{29}$, rounding-up is carried out and the result is fed to multiplexer 74.

Multiplexer 74 selects 14 bits ($2^{41}$ to $2^{28}$) of multiplying circuit 72 output as a first partial square root made up of a sign bit and 18-bit data. This first partial square root's sign is plus and the leading bit of the data is 0. The first partial square root is fed from multiplexer 74 to inverter 76. In response, inverter 78 bit-inverts the received partial square root, adds a 1 to the LSB, and outputs the result. In the first iteration, multiplicand generator 77 also receives multiplexer 74 output of which 14 bits are selected as $2^{26}$ to $2^{13}$ and all the other remaining bits are provided as zeros. (R+S×T) arithmetic unit 78 inputs R, S, and T to perform an (R+S×T) operation where R is shifter 78 output obtained by shifting RHC 71 output to the left 12 bit places, S is multiplicand generator 77 output and T is inverter 78 output. (R+S×T) arithmetic unit 78 output, FFE59000, is selected by multiplexer 70 and is set in RHC 71. Constant subtracter 79 subtracts 1 from an LSB of multiplexer 74 output. Multiplexer 80 selects constant subtracter 79 output if (R+S×T) arithmetic unit 78 output is minus, otherwise multiplexer 80 selects multiplexer 74 output. In the first iteration, multiplexer 80 selects constant subtracter 79 output because of the above-described conditions. DPAC 81 performs a digit place alignment operation in order to merge partial square roots found in each iteration. More specifically, if a partial square root is minus, top 2 bits of an output of multiplexer 80 composed of 14 bits are forced to zeros. If a partial square root is plus, then a shift operation is performed to shift the 14-bit output of multiplexer 80 for bit weight balance with an upper merged square root, and the result of the shift operation is provided. With respect to the first partial square root, input data is aligned in the $2^{25}$ to $2^{12}$ bit range and is provided. Adder 82 inputs MSRHC 75 output and DPAC 81 output thereby performing addition of these outputs, and the result of the addition operation is set in MSRHC 75.

Then, the process of the floating-point square root processing unit enters a second iteration calculation state. In the second iteration, TISU 69 gives the same output as the first iteration. A first remainder $R_1$ set in RHC 71 (i.e., FFE59000) is multiplied by 0FE1E in multiplying circuit 72 to provide a product, FESC1C6E000. Multiplexer 74 selects 3F2E ($2^{42}$ to $2^{29}$) as a second partial square root composed of one sign bit and 13-bit data. 3F2E is inverted by inverter 76 to be 00D1. 00D1 is provided with a 1 as an least significant bit and is output. (R+S×T) arithmetic unit 78 performs an arithmetic operation using 00D2 as a practical multiplier. Meanwhile, multiplicand generator 77 selects $2^{25}$ to $2^{12}$ of an output of MSRHC 75 as $2^{27}$ to $2^{14}$ and selects 13 bits excluding a head bit of a 14-bit output of multiplexer 74 as $2^{13}$ to $2^1$. Thereafter, multiplicand generator 77 provides 203BESC. (R+S×T) arithmetic unit 78 receives R, S, and T to perform an (R+S×T) operation, where R is shifter 73 output obtained by shifting RHC 71 output to the left 12 bit places, S is multiplicand generator 77 output and T is inverter 76 output. 00122778, an output of (R+S×T) arithmetic unit 78, is selected by multiplexer 70 and is set in RHC 71. Multiplexer 80 selects an output of multiplexer 74 and provides the selected output. DPAC 81 forces top 2 bits of the 14 bits to zeros and arranges the remaining 12 bits in the $2^{11}$ to $2^0$ bit range. Adder 82 adds an output of MSRHC 75 and an output of DPAC 81 to provide 80EF2E. Adder 82 output is set in MSRHC 75.

A 0, 8 bits provided by ECA 65, and $2^{22}$ to $2^0$ of adder 82 output are selected as a sign bit for $2^{31}$, as a resultant exponent of $2^{30}$ to $2^{23}$, and as a resultant mantissa of $2^{22}$ to $2^0$, respectively, and a final result is provided from the square root processing unit of FIG. 7 in the form of 3A00EF2E.

In accordance with the present square root processing unit of FIG. 7, a 12-bit address, obtained by performing an address modification operation on an output of normalization circuit 67, is used as an address to retrieve an ARSQR from TISU 69. This not only reduces the amount of hardware required to construct TISU 69 but also provides a high-performance square root processing unit.

In accordance with the square root processing units of FIGS. 1 and 7, the precision of ARSQR for radicands lying in the [1,2] range and the precision of ARSQR for radicands lying in the [2,4] range are brought to be the same because an address, used to find an approximation of the reciprocal of a square root of a [1,2]-range radicand, is longer by one bit than an address used to find an approximation of the reciprocal of a square root of a [2,4]-range radicand. Therefore, the present invention is able to provide a table information store unit with a size two thirds that of a conventional one by reducing an address of the [2,4] range by one bit, when the same convergence speed is to be accomplished. When improving the speed of convergence, by increasing the length of a [1,2] address by one bit, it is possible to provide a table information store unit having a size not twice but 4/3 of that of a conventional one. This aspect of the present invention presents the advantage that the amount of hardware required to construct a table information store unit can be reduced.

Further, because of the FIG. 2 multiplying circuit, the operation of the carry look ahead circuit can stay unchanged throughout all the iterations. This contributes to reduction in the amount of hardware and to calculating partial square roots a little greater in each iteration after the first iteration. This prevents such an occurrence that a partial square root is lower by one than an exact square root in the numeric value range above an LSB of a partial square root found in each iteration after the first iteration.

Before discussing a division processing unit of the present invention, the relationship of an approximation of the reciprocal of divisor (ARD) versus the division convergence is explained. This relationship is fully described in U.S. Pat. No. 5,065,352. Whereas U.S. Pat. No. 5,065,352 describes such using P-base numbers, binary numbers are used here because the address of the table information store unit is represented in the binary notation (i.e., P=2).

In the following mathematical expressions:

$D_0$=absolute-valued/bit-normalized divisor $N_0$=absolute-valued/bit-normalized dividend M=approximation to the reciprocal of $D_0$ $Q_i$=ith partial quotient $R_i$=ith partial remainder Note: $R_0=N_0$ $N_i$=quantity (=$R_{i-1}×M-Q_i$)

G=multiplicand to be multiplied by $Q_i$ when finding, from $Q_i$ and $N_i$, a sum of $Q_{i+1}+N_{i-1}$ (=$R_i×M$)

$\alpha+1$=partial quotient's size Note: there is a one-digit overlap between adjacent partial quotients that are serially numbered.

Q=exact quotient Note: if a dividend cannot be exactly divided by a divisor then end-around occurs.

$Q_{LAST}$=LASTth partial quotient $Q^*$=quantity resulting from taking Q's digits higher than or equal to $Q_{LAST}$'s rightmost digit X=$Q_{LAST}$'s rightmost digit having a magnitude of 1

Y=$Q_{LAST+1}$'s leftmost digit when finding a partial remainder $R_{LAST}$(=$Q_{LAST+1}$) that is multiplied by M, taking $Q_{LAST}$+X=partial quotient, where Y and X are in the same digit place.

A sufficient condition for a partial quotient to determine ($\alpha+1$) digits is to choose an appropriate M that satisfies the following mathematical expression (B1).

$$1-2^{-(\alpha+2)}<D_0×M<1 \tag{B1}$$

Calculations, given by the following mathematical expressions (B2) and (B3), are performed prior to an iterative calculation.

$$G=1-D_0×M \tag{B2}$$

$$Q_1+N_1=N_0×M \tag{B3}$$

In the iteration, a calculation, in accordance with the following mathematical expression (B4), is carried out.

$$Q_i+N_i=G×Q_{i-1}+N_{i-1} \text{ Note: } 2\leq i\leq LAST \tag{B4}$$

A calculation, given by mathematical expression (B5), is performed to check for contribution to $Q^*$ from $Q_{LAST+1}$ on. $Q^*$ is found from mathematical expression (B6).

$$Q_{LAST+1}+N_{LAST+1}=G×(Q_{LAST}+X)+N_{LAST} \tag{B5}$$

$$Q^*=Q_1=Q_2+\ldots+Q_{LAST}+Y \tag{B6}$$

U.S. Pat. No. 5,065,352 shows that a quotient can be found by the above-described procedure.

If only the floating-point number division operation is considered and $D_0$ (i.e., a mantissa of a normalized floating-point number to the IEEE standard) is handled, $D_0$ falls within the range of the following mathematical expression (B7). The processing of fixed-point numbers can be deduced from the following explanation as to the processing of floating-point numbers.

$$1 \leq D_0 < 2 \quad (B7)$$

In accordance with U.S. Pat. No. 5,065,352, as shown in mathematical expression (B8), the length of address in cases where top 2 bits of a mantissa are 10 and the length of address in cases where they are 11 are the same if an address to retrieve an ARD is composed of 9 bits following a most significant bit of a bit-normalized mantissa.

$$1.0xxxxxxxx1.1xxxxxxxx \quad (B8)$$

In contrast to U.S. Pat. No. 5,065,352, the present invention has features as follows. That is, as shown in mathematical expression (B9), in every case where top 2 bits of a mantissa are 10 and in some cases where they are 11, one bit is extra taken. As a result, the precision of ARD when top 2 bits of a mantissa are 10 and the precision of ARD when they are 10 are the same. However, for some numbers, it is necessary to improve the ARD precision even if the top 2 bits are 11.

$$\begin{array}{l}1.0\ x\ x\ x\ x\ x\ x\ x\ x\ y \text{ (in every case where top 2 bits are 10) } 1.1 \\ x\ x\ x\ x\ x\ x\ x\ x \text{ (in most cases where top 2 bits are 11) } 1.1\ x \\ x\ x\ x\ x\ x\ x\ y \text{ (in some case where top 2 bits are 11)} \quad (B9)\end{array}$$

Note: x (y) represents either 0 or 1.

Numeric values, as reciprocal divisors, are selected within a range that satisfies $\alpha=8$ in mathematical expression (B1). The precision of ARD was confirmed using a computing machine in a way described below.

Figure 18:
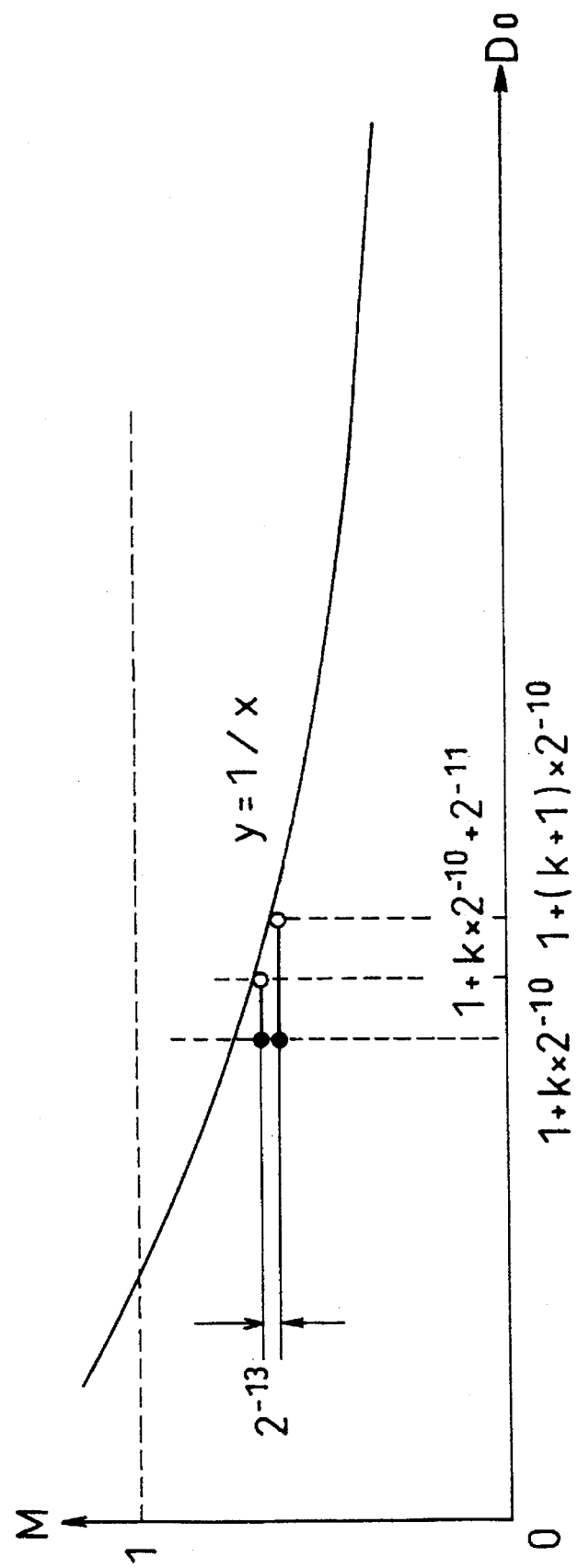
FIG. 18 is a descriptive diagram to illustrate the improvement in M .(i.e., ARD)
Figure 19:
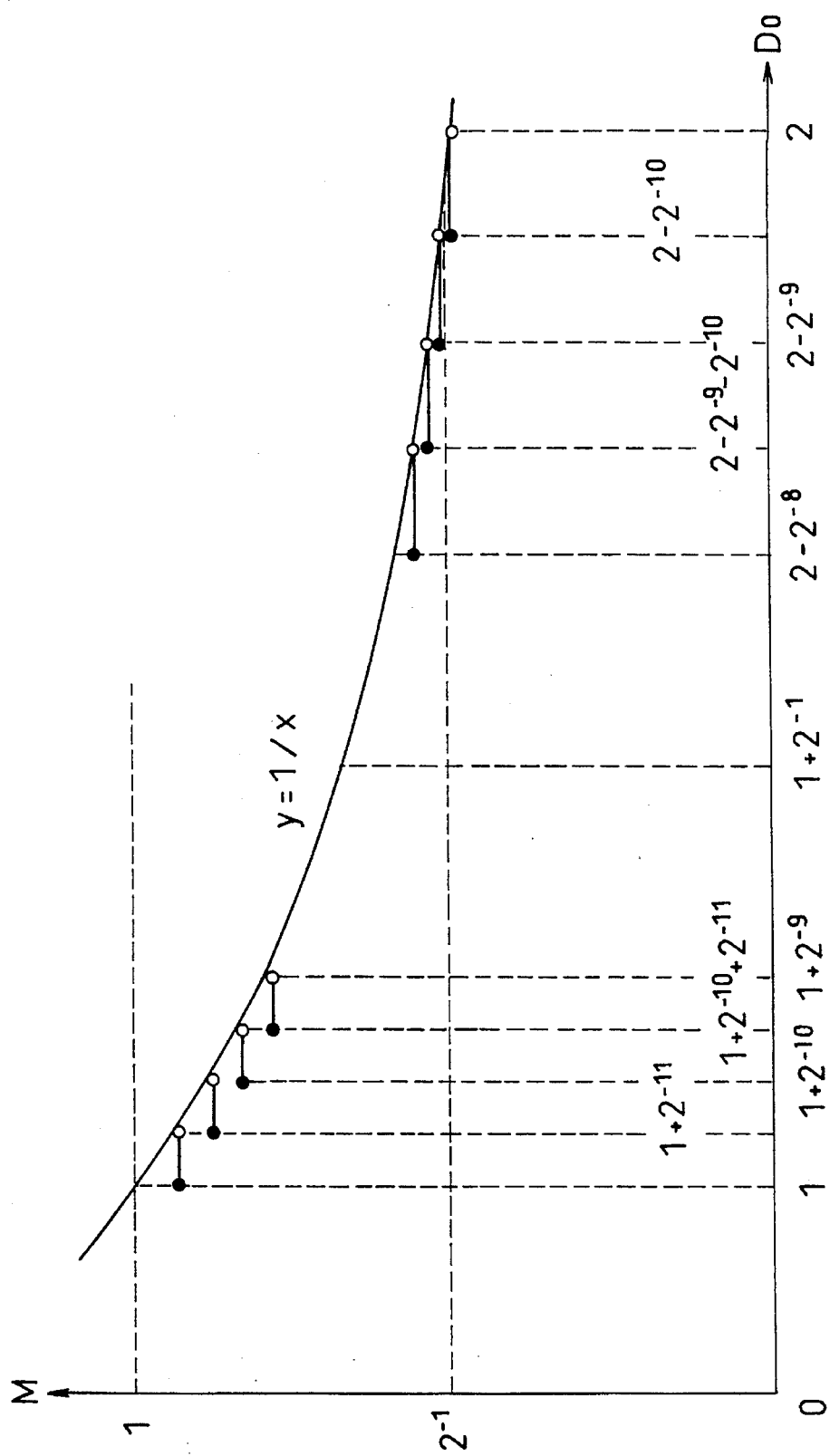
FIG. 19 shows the relationship of $D_0$ (i.e., divisor) versus M.
Figure 20:
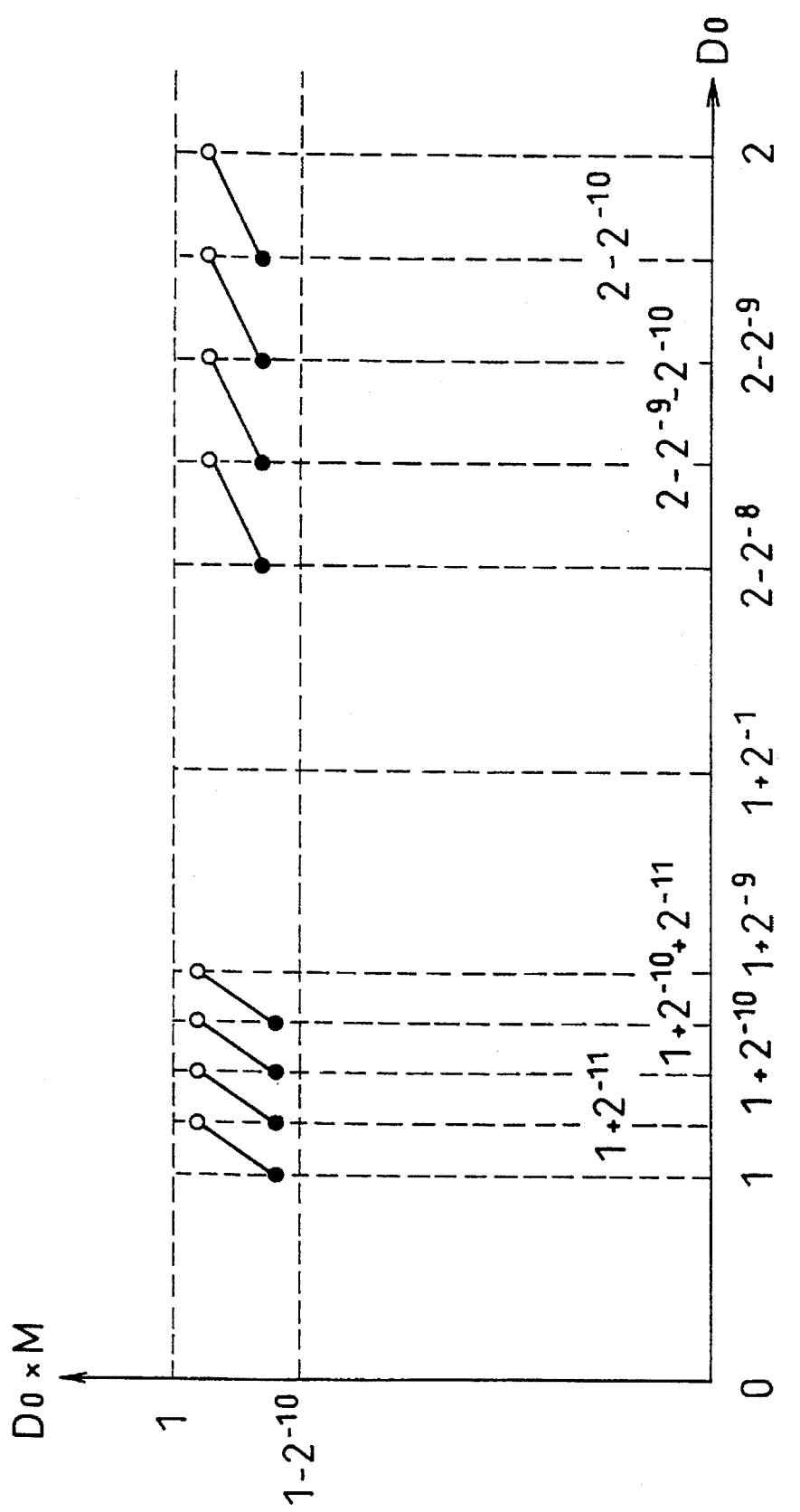
FIG. 20 shows the relationship of $D_0$ versus $D_0 \times M$.

M is a constant in $[1+k\times 2^{-10}, 1+(k+1)\times 2^{-10}]$ resulting from dividing the range $[1, 1+2^{-1}]$ into 512 equal divisions (k=0, 1, . . ., 511). Further, M is a constant in $[1+2^{-1}+k\times 2^{-9}, 1+2^{-1}+(k+1)\times 2^{-9}]$ resulting from dividing the range $[1+2^{-1}, 2)$ into 256 equal divisions (k=0, 1, . . .,255). Additionally, in order to further improve the precision of ARD, either $2^{-13}$ or $2^{-12}$ is added to, by a method which is described later, to an output value of the table information store unit, if $2^{-11}$ or $2^{-10}$ which is lower by one bit than an LSB to be used as an address of the table information store unit, is zero. This can be described by reference to a graph of FIG. 18. As shown in FIG. 18, y=1/x is a curve that moves diagonally down to the right. This means that, in the left half of $[1+k\times 2^{-10}, 1+(k+1)\times 2^{-10}]$ (or $[1+2^{-1}+k\times 2^{-9}, 1+2^{-1}+(k+1)\times 3^{-9}]$), the value of an ARD is increased by $2^{-13}$ (or $2^{-12}$). Therefore, a graph of M with respect to a divisor used in dividing the range $[1, 1+2^{-1}]$ and the range $[1+2^{-1}, 2]$ is a step function graph. On the other hand, a $D_0 \times M$ graph takes a sawtooth shape formed by 1024 line segments and 512 line segments. At this point, within the range $[1+2^{-1}, 2]$ there are 100 line segments unsatisfying mathematical expression (B1) when $\alpha=8$, so that $2^{-9}$-width intervals containing these 100 line segments are divided into two divisions. The final precision obtained is shown below (hexadecimal notation).

Maximum 1. BC8→0. FFFFF8
Minimum 1. 000 and 1. 800→ 0. FFC000

The number of intervals varies with the value of $\alpha$. FIG. 21 shows comparison between the table entry count in a prior art according to U.S. Pat. No. 5,065,352 and the table entry count in the present invention and shows the ratio.

For the case of the 10-bit address, digits from $2^{-2}$ to $2^{-13}$ of a reciprocal divisor are stored into the table information store unit. On the other hand, for the case of the 9-bit address, digits of $2^{-2}$ to $2^{-12}$ are stored. Neither a sign bit that is always 0 nor the $2^{-1}$ bit that is always 1 is not stored into the table information store unit. During the process of multiplication, an inverse of an adjacent bit on the right side to a bit used as an address is added to the tail. Such an inverse is added to $2^{-14}$ in the case of the 10-bit address, and to $2^{-13}$ and $2^{-14}$ in the case of the 9-bit address. This provides a $2^{-13}$-fold effect and a $2^{-12}$-fold effect.

Figure 22:
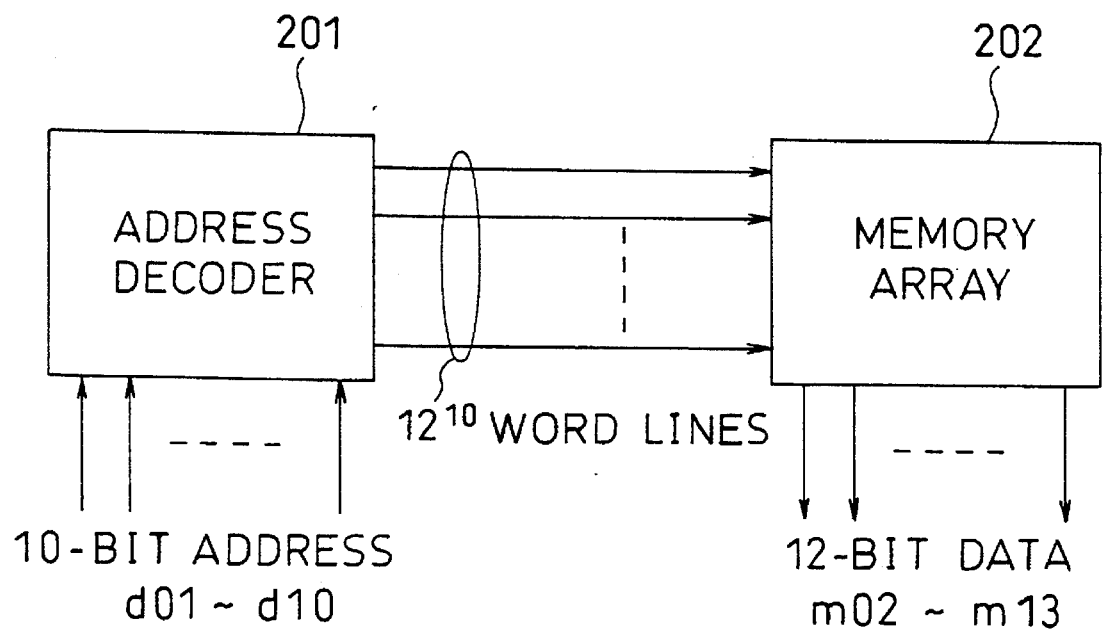
FIG. 22 is a block diagram that roughly shows the internal organization of an approximate reciprocal ROM forming FIG. 12 table information store unit.
Figure 23:
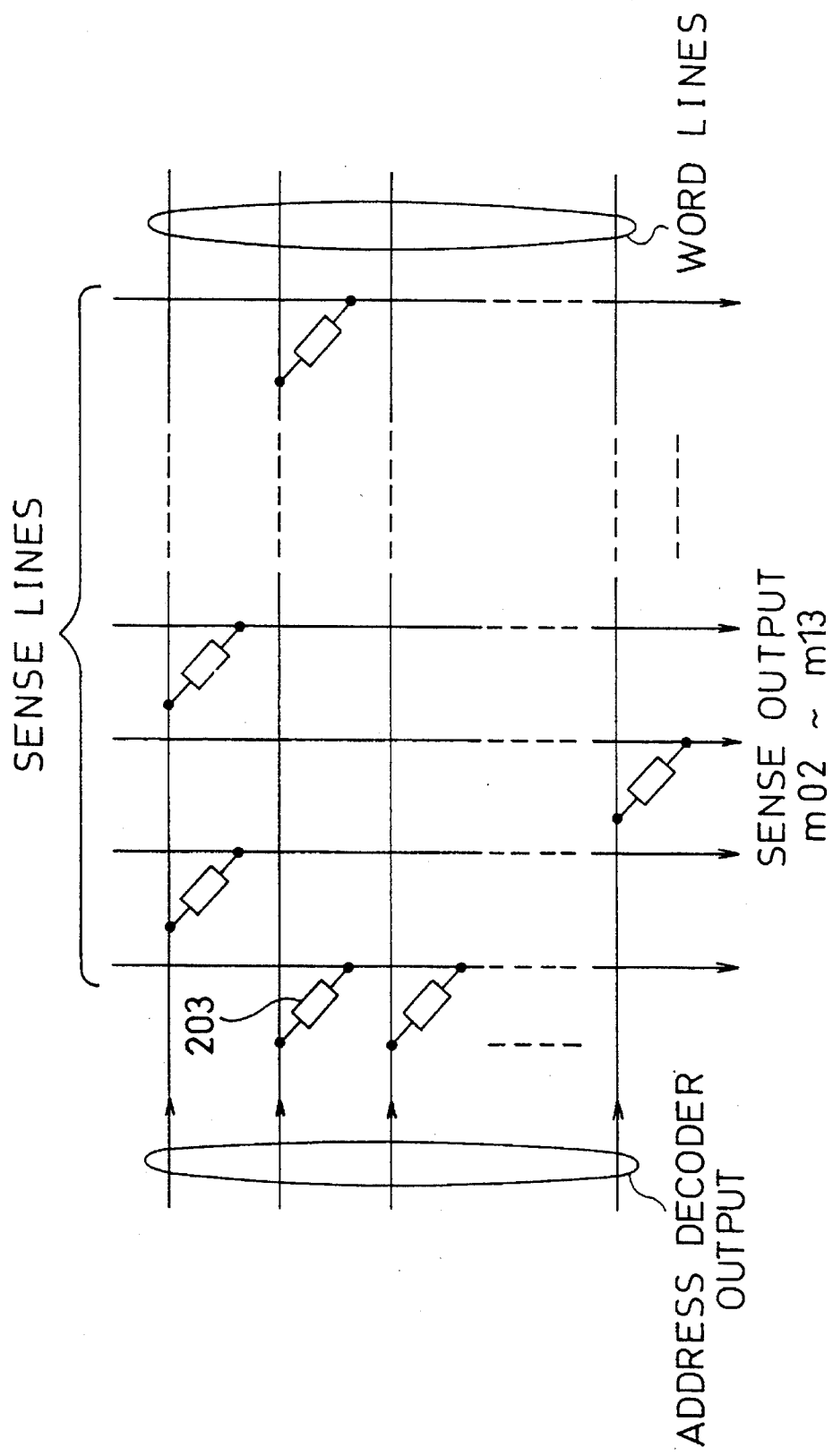
FIG. 23 is a basic structure of the FIG. 22 memory array.

An approximate reciprocal ROM forming the table information store unit is schematically described. FIG. 22 describes this ROM by breaking it into two sections. 201 is an address decoder. 202 is a memory cell array. Note that each entry of memory cell array 202 is accessed by a 10-bit address. If a 10-bit address, d01–d10, is applied, address decoder 201 selects one of $2^{10}$ word lines. In response, memory cell array 202 provides corresponding data of 12 bits, m02–m13. FIG. 23 shows a basic structure of memory cell array 202. There are shown word and sense lines in the figure. Information is stored by whether a connection is established between a word line and a sense line by element 203.

The structure of the table information store unit is illustrated through an example where the address length is 9 or 10 bits at $\alpha=8$ in FIG. 21.

FIG. 24 is a diagram showing specified values at extreme points of line segments, assuming that an approximate reciprocal ROM is accessed only by an address having an address length of 9 bits if an address head bit is 1. FIG. 25 is a diagram showing specified values at extreme points of line segments when an approximate reciprocal ROM is partly accessed by an address having an address length of 10 bits if an address head bit is 1. Since the addresses of FIG. 24, represented in decimal notations, represent decimal numbers when an address is considered to have an address length of 10 bits, two different decimal numbers are shown in the case of an address having an address length of 9 bits. For the case of 906/907, if 0.87A is used as an approximate reciprocal, 0.FFBD38 (left line-segment minimum) does not satisfy mathematical expression (B1). On the other hand, if 0.87B is used as an approximate reciprocal, 1.000110 (right line-segment maximum) does not satisfy mathematical expression (B1), either. Therefore, if re-division is carried out for conversion into a 10-bit address, values at extreme points of all the line segments satisfy mathematical expression (B1) (see FIG. 25).

Figure 26:
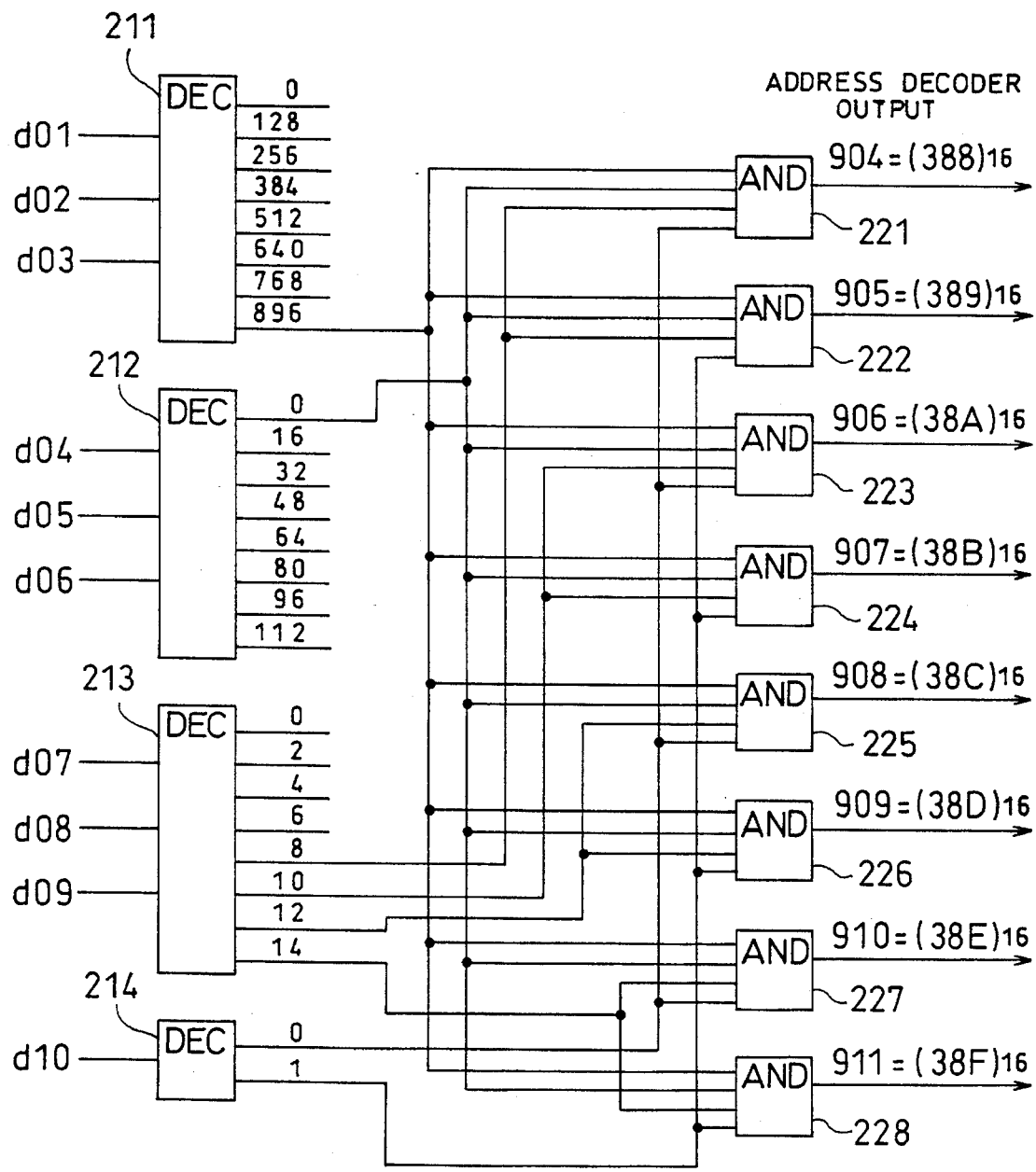
FIG. 26 is a block diagram of an address decoder corresponding to FIG. 24.
Figure 28:
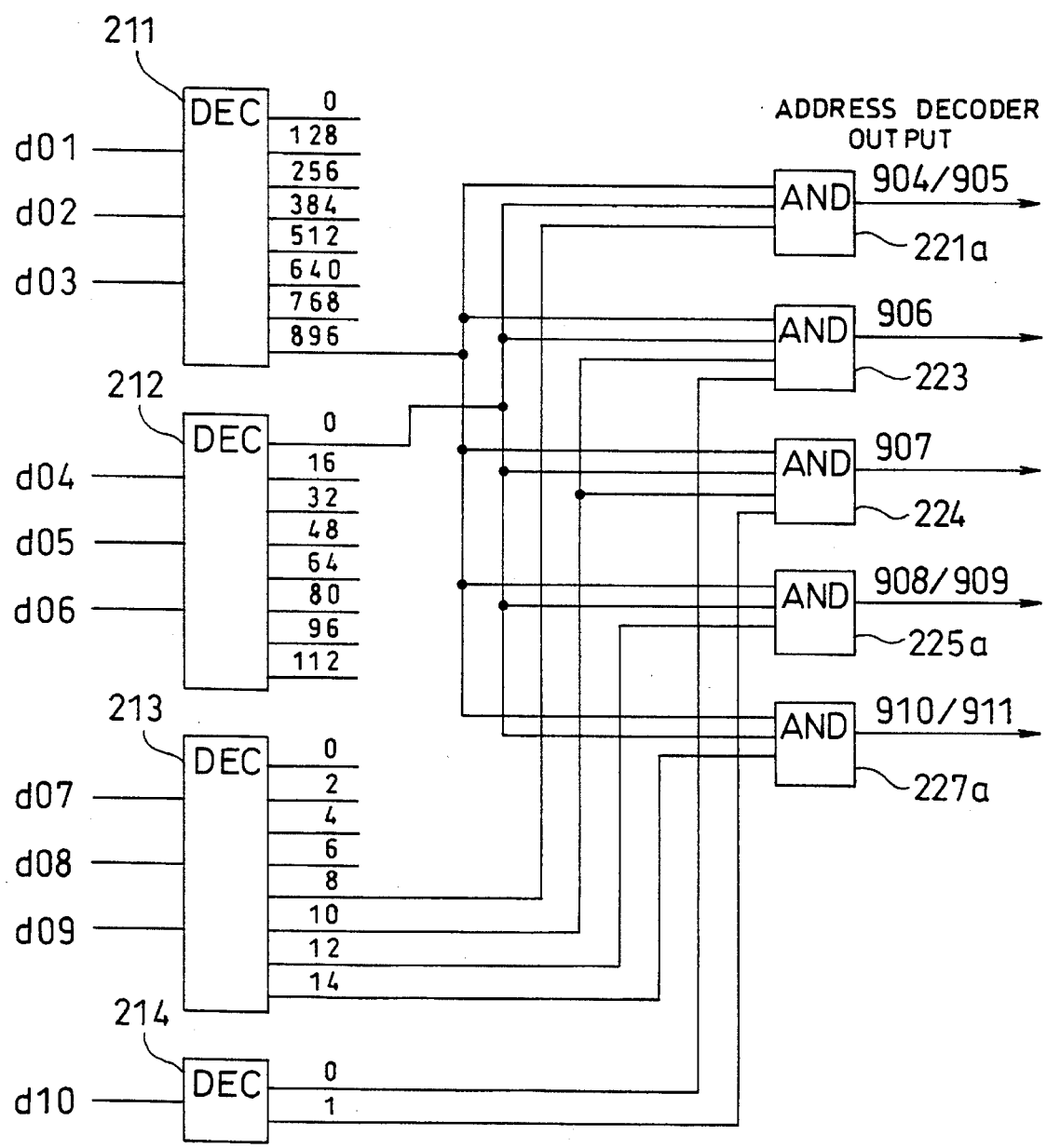
FIG. 28 is a block diagram of an address decoder corresponding to FIG. 25.

An example of implementation of the table information store unit is now described below. An address decoder, shown in FIG. 26, is formed by taking each of eight addresses 904–911 represented in decimal notations, as a 10-bit address. FIG. 26 shows 3-input decoders 211–213, a 1-input decoder 214, and AND circuits 221–228. FIG. 27 is a truth table for 3-input decoders 211–213. Since it is possible to employ 9-bit addresses for all tile addresses excluding addresses 906 and 907, output from 1-input decoder 214 receiving d10 to six AND circuits, namely AND circuits 221, 222, 225, 226, 227, and 228 is deleted. In other words, 904 and 905 (908 and 909, and 910 and 911) are made common to serve as an output of the address decoder. As a result, an address decoder, shown in FIG. 28, is obtained. AND circuit 221a results from unifying AND circuits 221 and 222. AND circuit 225a results from unifying AND circuits 225 and 226. AND circuit 227a results from unifying AND circuits 227 and 228. Each memory array entry, too, is made common so as to suit the fact that the outputs of the address decoder are made common. This operation is carried out with respect to all the addresses from 0 to 1023, as a result of which a table information store unit including concurrently 9- and 10-bit addresses is obtained. By applying the present invention to semiconductor circuits, it becomes possible to reduce chip areas by decreasing areas for the memory cell array every time entries are shared.

When a multiplication is performed during the course of a division operation, a multiplier is divided into groups each of which is composed of three bits with a one-bit overlap, so as to generate multiples of a multiplicand in accordance with the Booth's algorithm as shown in FIG. 3, and a partial carry and a partial sum, found by a carry save adder (CSA) array in a tree form, are summed together by two carry propagation adders (CPAs) to find a final product.

Figure 12:
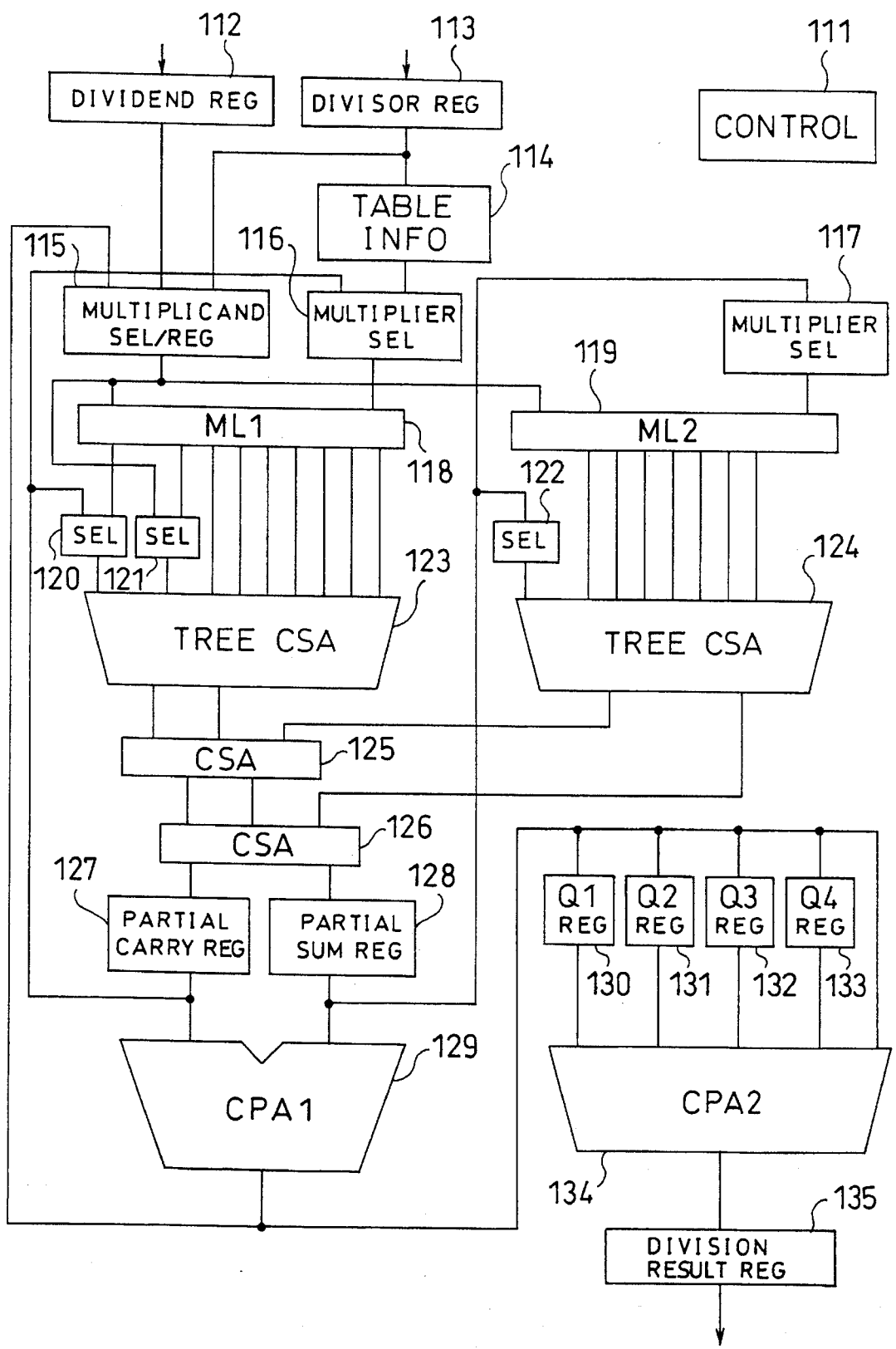
FIG. 12 is a block diagram of a mantissa processing section in a floating-point division processing unit of the present invention.

FIG. 12 shows a section for processing mantissas in a floating-point division processing unit in accordance with a preferred embodiment of the present invention. An exponent of a divisor is subtracted from an exponent of a dividend and the result is given a bias value of 7F to become an exponent of intermediate quotient. In computation of mantissas, if $2^0$ bit of a mantissa of a quotient is 0, then 1 is subtracted from the exponent of intermediate quotient. If $2^0$ bit of a mantissa of a quotient is 1, then the exponent of intermediate quotient becomes a final exponent of the quotient. The sign of quotients is found from an exclusive OR of a dividend sign bit and a divisor sign bit. Since the present invention is directed to the mantissa, the description of the exponent and the sign is over here.

The FIG. 12 division processing unit inputs a dividend and a divisor with addition of an implied 1 of $2^0$ bit to their respective mantissas represented in IEEE single precision floating-point number representations, thereby outputting a quotient taking a form of a resultant mantissa including $2^0$ bit. Data for partial quotients each have a bit length of 9 bits and there is a 1-bit overlap between each partial quotient.

Shown in FIG. 12 are control circuit 111 for controlling the division processing unit, dividend register 112, divisor register 113, table information store unit (TISU) 114, multiplicand selector/register (MSR) 115, first multiplier selector 116, second multiplier selector 117, first multiple generator (ML1) 118, second multiple generator (ML2) 119, first selector 120, second selector 121, third selector 122, first tree-like carry save adder (FTCSA) 123, second tree-like carry save adder (STCSA) 124, carry save adder (CSA) 125, carry save adder (CSA) 126, partial carry register (PCR) 127, partial sum register (PSR) 128, first carry propagation adder (CPA1) 129, $Q_1$ register 130, $Q_2$ register 131, $Q_3$ register 132, $Q_4$ register 133, second carry propagation adder (CPA2) 134, and division result register (DRR) 135.

A mantissa of a dividend is input and is set in dividend register 112, and a mantissa of a divisor is input and is set in divisor register 113. 11 bits ($2^{-1}$ to $2^{-11}$) of an output of divisor register 113 are loaded to TISU 114.

FIG. 13 shows an example of TISU 114 having approximate reciprocal ROM 151, inverters (NOT) 152 and 153, and selectors 154 and 155. ROM 151 stores $2^{-2}$ to $2^{-13}$ of an ARD (m02, m03, ..., m12, m13) and a flag, (f), that signifies whether the length of address is 9 or 10 bits. In other words, typically, ROM 151 stores (m02, m03, ..., m12, m13, f). If the address length is 9 bits, ROM 151 stores a 0 as m13 and a 1 as f. If the address length is 10 bits, ROM 151 stores a 0 as f. If f=0, selector 154 selects an output of ROM 151 (i.e., m13) and selector 155 selects an output of inverter 153 (i.e., an inverse of d11). If f=1, selector 154 and selector 155 each select an output of inverter 152 (i.e., an inverse of d10).

FIGS. 29 and 30 show approximate reciprocals to be indexed at the time when the address value changes from 64 to 112 (decimal notation).

Figure 31:
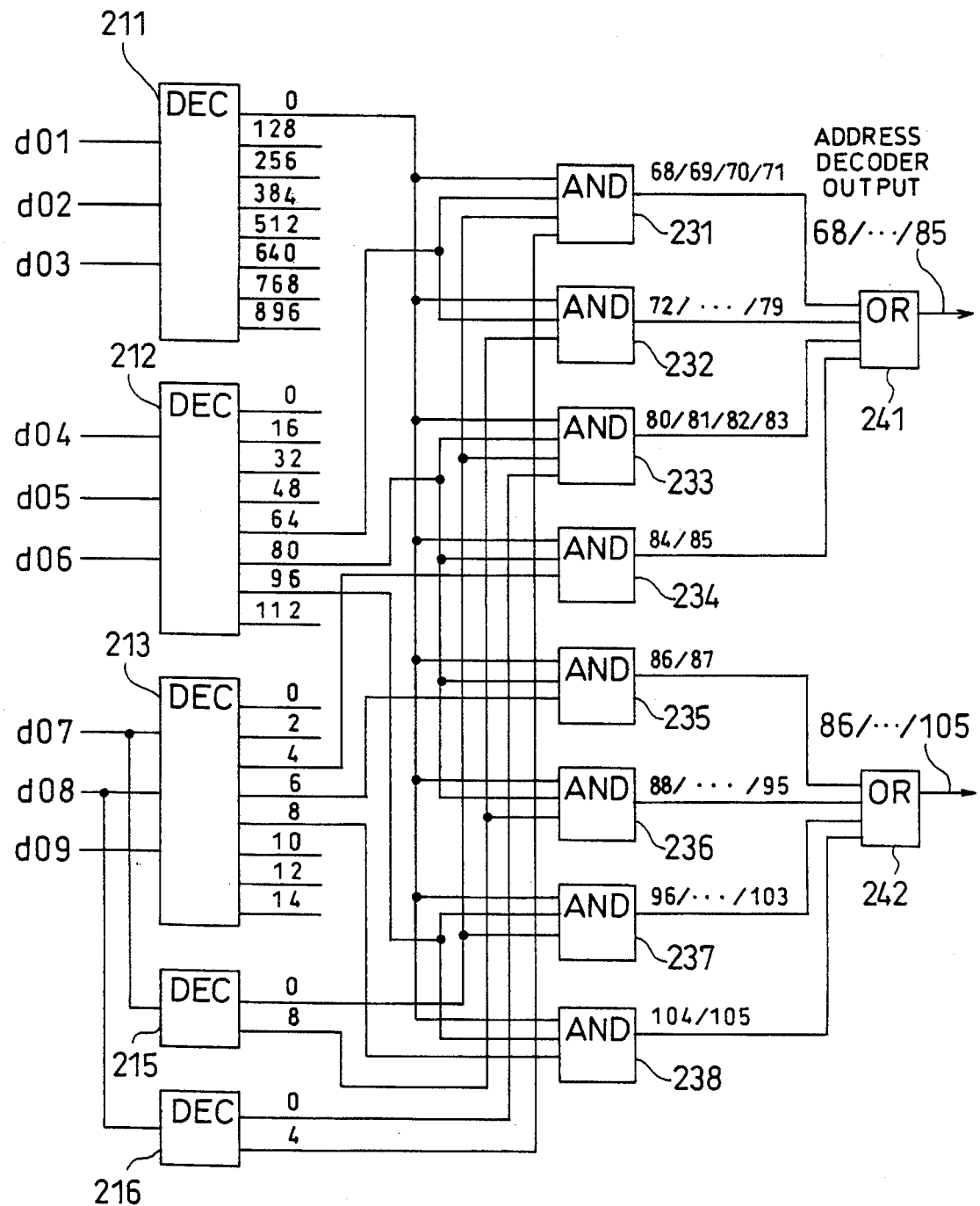
FIG. 31 a block diagram of an address decoder corresponding to FIGS. 29 and 30 when an ARD to be stored is divided into upper and lower bits and only some of the upper bits that differ from one another are stored in an approximate reciprocal ROM.

If TISU 114 is divided into two parts, namely an upper part for storing 5 fractional digits of ARD from the second to sixth binary places and a lower part for storing 7 fractional digits of ARD from the seventh to thirteenth binary places, the storage digits (binary notation) of the upper part are constant i some range, e.g., 11011 when the address value changes from 68 to 85, and 11010 when the address value changes from 86 to 105. The outputs of the address decoder are made to be shared taking into account a Karnaugh map of FIGS. 29 and 30, which is shown in FIG. 31. FIG. 31 shows 3-input decoders 211–213, 1-input decoders 215 and 216, AND circuits 231–238, and OR circuits 241 and 242. AND circuits 231–238 and OR circuits 241 and 242 are operable to encode the outputs of decoders 211–213 and 215–216 in accordance with the Karnaugh map of FIGS. 29 and 30. In this example, 5 fractional digits of ARD are stored in the upper part of TISU 114, therefore, there are 32 storage values (decimal notation) from 0 to 31. If the outputs of the address decoder are made common in every case, the number of entries of an upper memory cell array is 32.

The above-described way of reducing the number of entries of a memory cell array on the upper side is applicable in cases where TISU 114 is fed only 10-bit addresses or 9- and 10-bit addresses. For the case of the 10-bit address, the entry count is 1024, and the aforesaid entry count (i.e., 32) is 1/32 of this 1024. As a result, 5 bits×(1024−32) entries, or a memory capacity reduction effect of 4960 bits is accomplished. This effect more than compensates for an increase in hardware scale caused by dividing TISU 114 into two parts and by the provision of an address encoder section.

In the present embodiment, the storage digits of TISU 114 are divided between the sixth binary place and the seventh binary place. However, they may be divided, for example, between the seventh binary place and the eighth binary place. In other words, the storage digits of TISU 114 may be divided into two portions at any appropriate place if the effect of area reduction and the read rate of table information are considered in accordance with characteristics of physical implementation means. In cases where an address encoder section becomes too complicated in structure, an upper part of a memory cell array may store identical digits in two or more different entries thereof.

Figure 14:
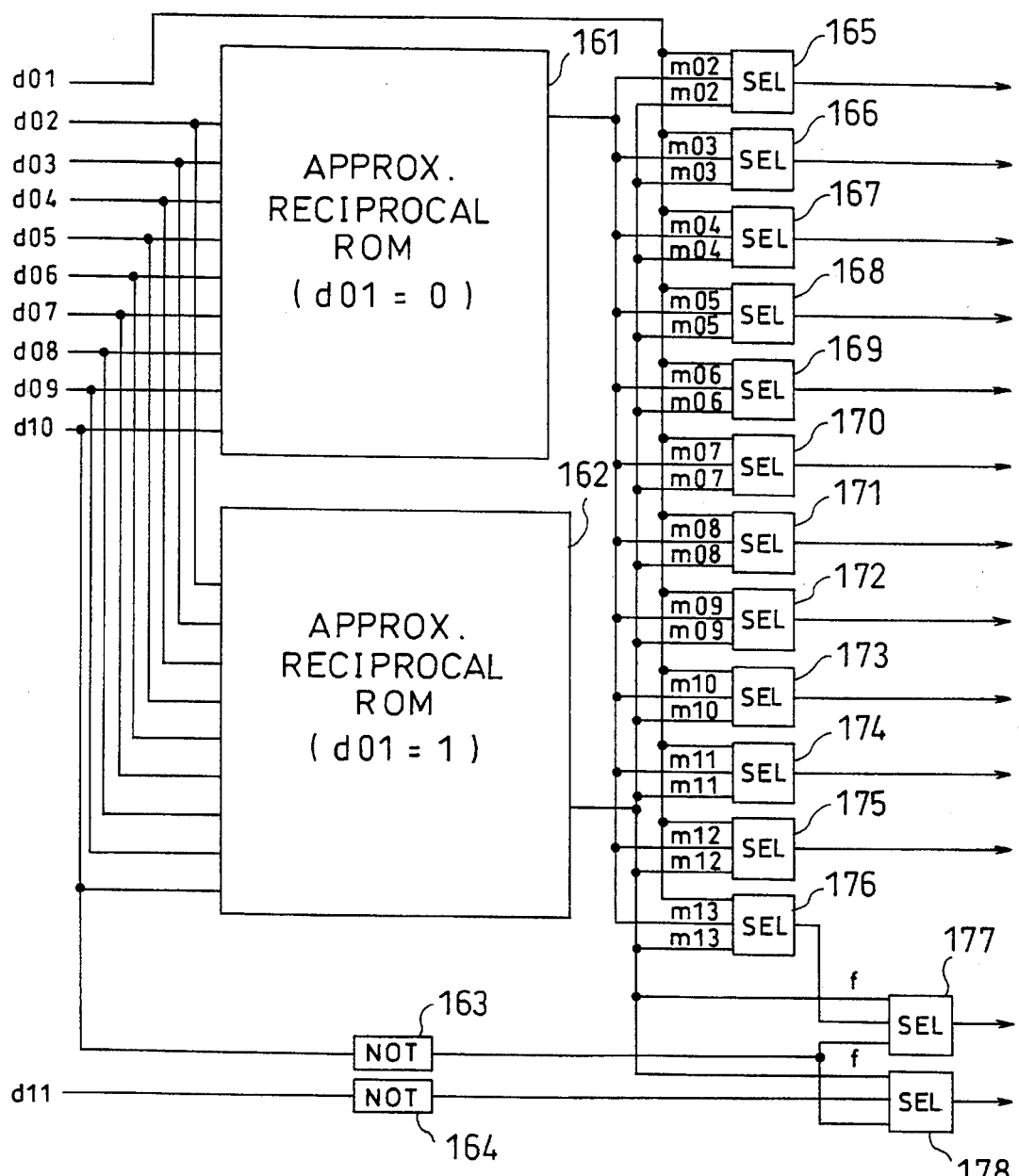
FIG. 14 is a block diagram of a revision of the FIG. 12 table information store unit.

FIG. 14 shows TISU 114 in accordance with another embodiment of the present invention. First and second approximate reciprocal ROMs 161 and 162, inverters (NOT) 163 and 164, and selectors 165–178 are shown in FIG. 14. ROM 161 is used when a head bit of an address, d01, is 0 and stores bits (from $2^{-2}$ to $2^{-13}$) of an ARD (m02, m03, ..., m12, m13). ROM 162 is used when a head bit of an address, d01, is 1 and stores bits (from $2^{-2}$ to $2^{-13}$) of an ARD (m02, m03, ..., m12, m13) and a flag, (f), that signifies whether the length of address is 9 or 10 bits. If an address has a length of 9 bits, ROM 162 stores a 0 as m13 and a 1 as f. If an address has a length of 10 bits, ROM 162 stores a 0 as f. If d01=0, selectors 165–176 each select ROM 161 output. If d01=1, selectors 165–176 each select ROM 162 output. If f=0, selector 177 selects selector 176 output and selector 178 selects an output of inverter 164 (i.e., an inverse of d11). If f=1, selector 177 and selector 178 each select an output of inverter 163 (i.e., an inverse of d10).

Again, in FIG. 12, an approximate reciprocal, provided from TISU 114, is added a sign bit that is always 0 and a $2^{-1}$ bit that is always 1 and is loaded to first multiplier selector 116. Within first multiplier selector 116, TISU 114 output is inverted to provide—M in the first iteration, and a multiplication operation of $D_0 \times (-M)$ of mathematical expression (B2), where $D_0$ is the divisor set in MSR 115, is performed by ML1 118, FTCSA 123, CSA 125, CSA 126, PCR 127, PSR 128, and CPA1 129.

A partial carry of $D_0 \times (-M)$ is set in PCR 127 and a partial sum thereof is set in PSR 128. At the same time, a dividend, $N_0$, output from dividend register 112, is set in MSR 115, and first multiplier selector 116 selects M. A multiplication operation of $N_0 \times M$ of mathematical expression (B3) is performed, like $D_0 \times (-M)$. A partial carry of $N_0 \times M$ is set in PCR 127 and a partial sum thereof is set in PSR 128. At the same time, a product of $D_0 \times (-M)$ is set in MSR 115 where $2^0$ bit and digit places above $2^0$ are forced to zeros, which is equal to an operation of $D_0 \times (-M)+1$. In the operations of $D_0 \times (-M)$ and $N_0 \times M$, second multiplier selector 117 and third selector 122 each provide a 0. As a result, STCSA 124 provides a partial carry of 0 and a partial sum of 0, and first selector 120 and second selector 121 each select ML1 118 output.

An iterative calculation of mathematical expression (B4) is performed, with $Q_{i-1}$ and $N_{i-1}$ in the form of a partial carry and a partial sum.

Figure 17:
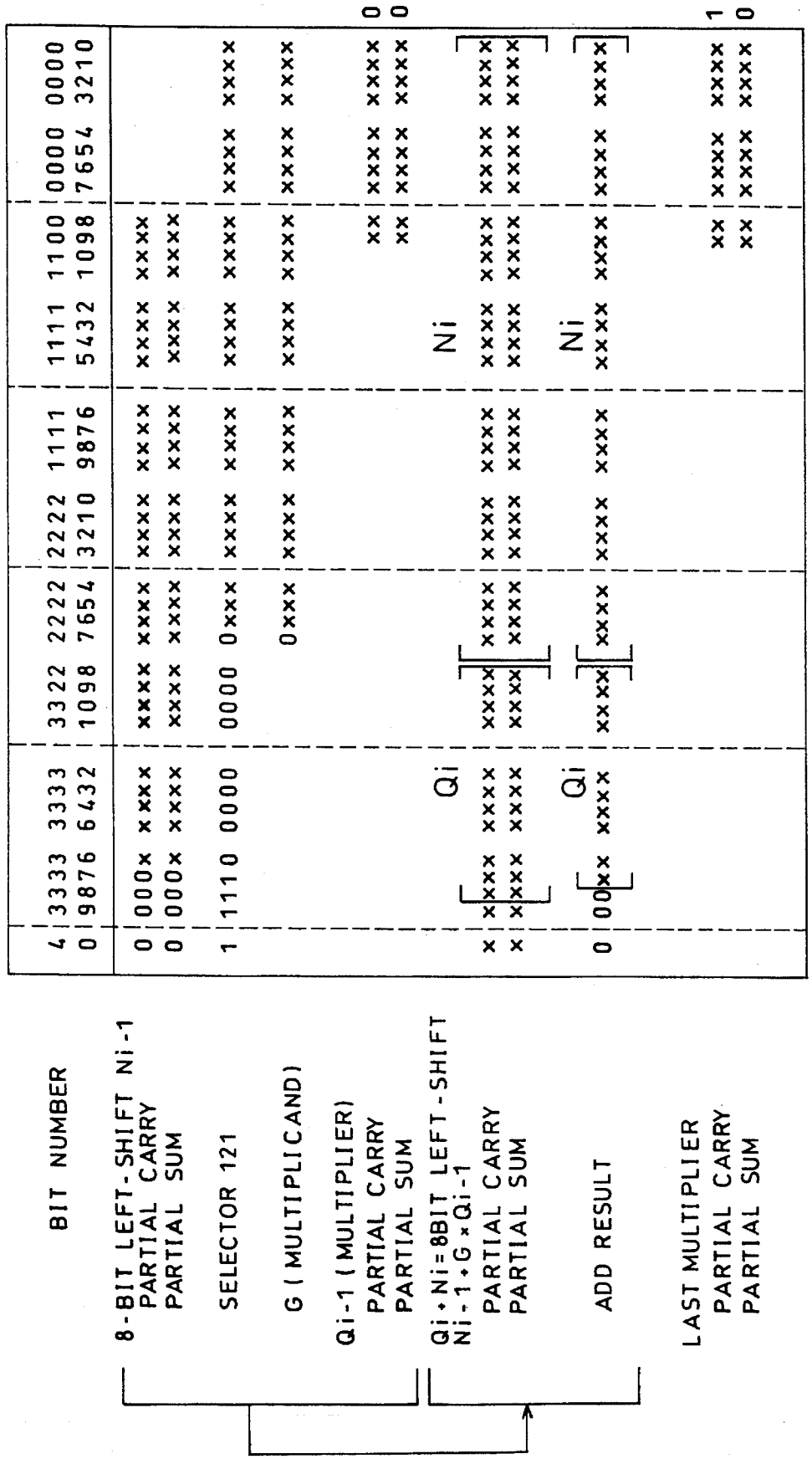
FIG. 17 shows a third process of arithmetic operation execution by the FIG. 12 division processing unit.

First multiplier selector 116 selects from PCR 127 a partial carry of $Q_{i-1}$, whereas second multiplier selector 117 selects from PSR 128 a partial sum of $Q_{i-1}$. On the other hand, first selector 120 selects from PCR 127 a partial carry of $N_{i-1}$, whereas third selector 122 selects from PSR 128 a partial sum of $N_{i-1}$. A carry from $N_{i-1}$ to $Q_{i-1}$, which arises when summing partial carries and sums, is found by a carry look ahead section contained in CPA1 129. When such a carry arises, second selector 121 embedding-outputs a minus number to an upper portion of a multiple of G that should be generated originally. In this case, $N_{i-1}$ is excessively added as a partial carry and as a partial sum, and that minus number serves as a counterbalance to the carry from $N_{i-1}$ to $Q_{i-1}$. In FIG. 17, top 4 bits (i.e., 1111) of second selector 121 serves as a minus number for counterbalance.

A partial quotient, provided from CPA1 129, is sequentially set in from Q1 register 130 to Q4 register 133. A calculation of mathematical expression (B5), which differs from mathematical expression (B4) in that the tail of a partial carry of $Q_{LAST}$ is added a 1 by first multiplier selector 116, is performed. A calculation of mathematical expression (B6) is performed by CPA2 134 to find a quotient, $Q^*$. $Q^*$ is set in DRR 135.

An example of the operation of division is described using specific numeric values in which $D_0$=1. BC5432 (hexadecimal notation) and $N_0$=1. D1B6AC (hexadecimal notation), where $D_0$ is the divisor and $N_0$ is the dividend (see FIGS. 15–17).

(i) Bits ($2^{-11}$ and above $2^{-11}$) of $D_0$ are 1. BC4 (hexadecimal notation)=1. 1011 1100 010 (binary notation). - M, resulting from multiplying M by - 1, takes the following value. The hexadecimal notation is used unless noted otherwise, and the values of the partial carry and sum are omitted because of simplicity and because they are not important factors on the value of the quotient itself.

M=0.937

- M=. . . FF. 6C9

(ii) G=1+$D_0 \times$(- M)=0. 001942742 (see FIG. 15)

Figure 16:
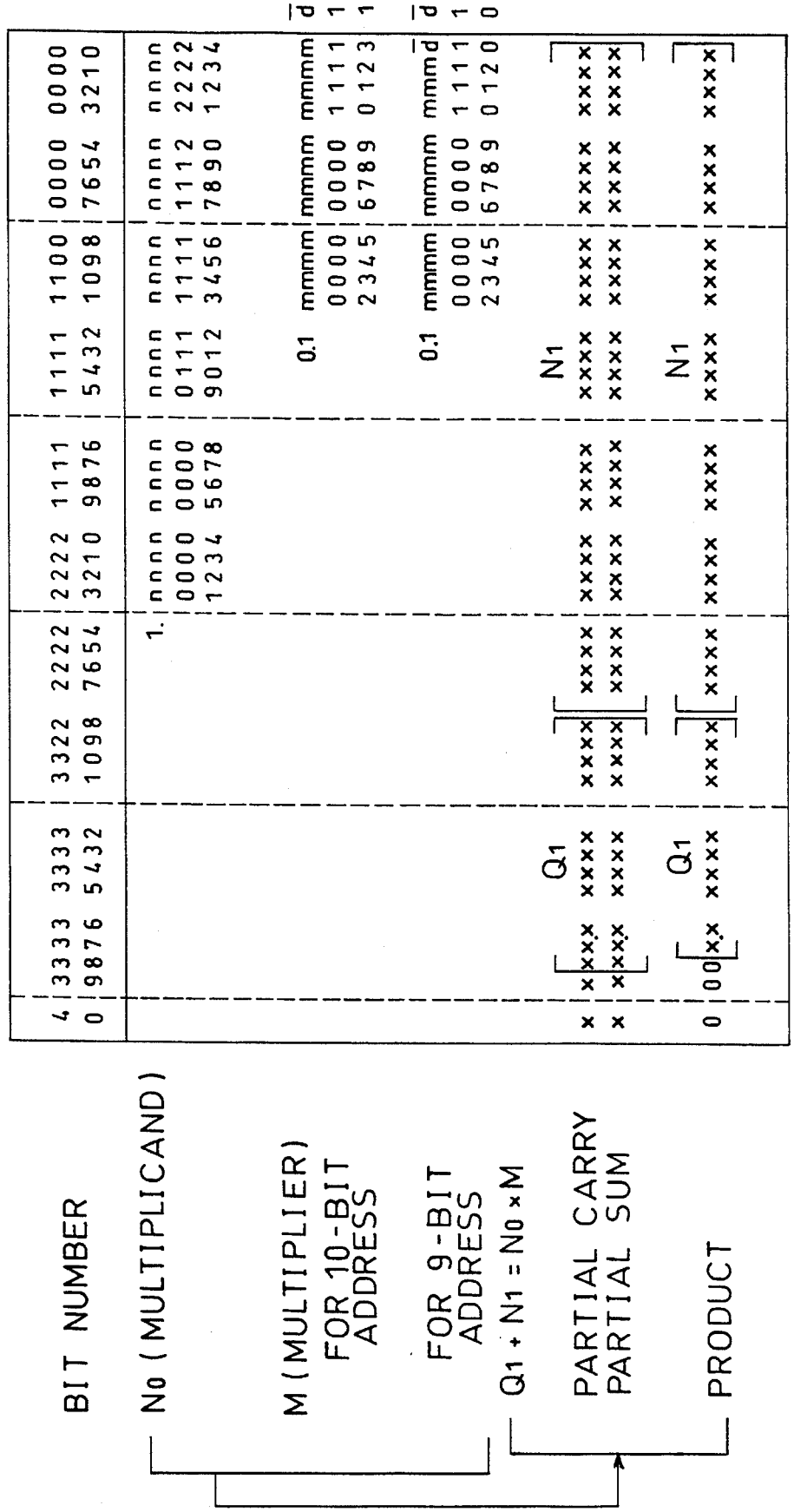
FIG. 16 shows a second process of arithmetic operation execution by the FIG. 12 division processing unit.

(iii) $Q_1+N_1=N_0 \times M$=1. 0C37A4AF4 $Q_1$=1. 0C $N_1$=0. 0037A4AF4 (see FIG. 16)

(iv) $2^8 \cdot (Q_2+N_2)=2^8 \cdot (G \times Q_1+N_1)$=0. 521640D18 $2^8 \cdot Q_2$=0. 52 $2^8 \cdot N_2$=0. 001640D18 (see FIG. 17)

(v) $2^{16} \cdot (Q_3+N_3)=2^{16} \cdot (G \times Q_2=N_2)$=0. 1E581AB24 $2^{16} \cdot Q_3$= 0. 1E $2^{16} \cdot N_3$=0. 00581AB24 (see FIG. 17)

(vi) $2^{24} \cdot (Q_4+N_4)=2^{24} \cdot (G \times Q_3+N_3)$=0. 5B107BDBC $2^{24} \cdot Q_4$=0. 5B $2^{24} \cdot N_4$=0. 00107BDBC (see FIG. 17)

(vii) $2^{32} \cdot (Q_5+N_5)=2^{32} \cdot \{G \times (Q_4+2^{-32})+N_4\}$=0.198FBD7B8 $Q^*$=1. 0C+0. 52×$2^{-8}$+0. 1E×$2^{-16}$+0. 5B×$2^{-24}$ =1. 0C521E5B )see FIG. 17)

"1.0C521E", as a mantissa of a quotient, is set in DRR 135. In order to support the rounding of division to the IEEE floating-point operation standard, it should be arranged in a way such that $2^{-25}$ of Q, serves as a guard bit, $2^{-26}$ of $Q^*$ serves as a round bit, and an OR of each bit of $2^{-27}$ to $2^{-32}$ and each bit lower than the binary point of $2^{32} \cdot (Q_5+N_5)$ serves as a sticky bit.

As described above, the FIG. 12 division processing unit is a system that indexes TISU 114 by using a part of an output of divisor register 113 as an address. TISU 114 stores, as entry information, a flag that signifies the address length. TISU 114 has entries with different address lengths. This permits TISU 114 to be constructed with a less amount of hardware thereby realizing a division processing unit with appropriate performance.

When indexing a table information unit that stores an initial value of a function or numeric values used during the course of a calculation by using a part of the value of a certain variable, it is possible for the present invention to improve the precision of quantities stored without doubling the size of the table information store unit. It is also possible for the present invention to reduce the circuit size of the table information store unit by about 14% to about 25% if the precision of quantities may remain unchanged (see FIG. 21).

In a table information store unit intended for a curve which moves diagonally up to the right, the above described top bits of 0 and 1 shall read, respectively, top bits of 1 and 0.

The invention claimed is:

1. A square root processing unit for extracting a square root of an input operand in a normalized format in units of two bits, said square root processing unit comprising:

a table information store means for storing an approximation of the reciprocal of said square root; and a means for retrieving information from said table information store means by an address composed of upper bits of said input operand;

said table information store means including:

an entry that is accessed by an address composed of N bits from the head of said input operand if top 2 bits of said input operand are 10 or 11, where said number N is a plus integer greater than or equal to three; and an entry that is accessed by an address composed of (N+1) bits from the head of said input operand if said top 2 bits are 01.

2. The square root processing unit of claim 1 further comprising a means for providing said table information store means with an address if said top 2 bits are 01;

said address resulting from replacing a 1 of said top 2 bits 01 with an (N+1)st bit.

3. The square root processing unit of claim 1 further comprising a means for appending, to a low-order position of an approximation of the reciprocal of a square root retrieved from said table information store means, either the inverse of an (N+1)st bit from the head of said input operand if said top 2 bits are either 10 or 11 or the inverse of an (N+2)nd bit from the head of said input operand if said top 2 bits are 01.

4. A square root processing unit for extracting a square root of a floating-point number input operand with an exponential radix of 2, said square root processing unit comprising:

a table information store means for storing an approximation of the reciprocal of said square root; and a means for retrieving information from said table information store means by an (N+1)-bit address;

said (N+1)-bit address resulting from an addition of a least significant bit of an exponent of said input operand and N bits from the head of a mantissa of said input operand, where said number N is a plus integer greater than or equal to two.

5. A square root processing unit for performing a first iterative calculation and subsequent iterative calculations, taking a radicand=$R_0$ where said $R_0$ is an initial value of a partial remainder:

wherein:

in said first iterative calculation:

said $R_0$ is multiplied by M where said M is an approximation of the reciprocal of a square root of said radicand, and a result of said multiplication operation is subjected to a rounding operation to produce a first partial square root $b_1$; and a square of said $b_1$ is subtracted from said $R_0$ to find a first partial remainder $R_1$;

in said subsequent iterative calculations following said first iterative calculation:

an ith partial remainder $R_i$, found in an ith iterative calculation, is multiplied by said M, where said number i is a plus integer, and a result of said multiplication operation is subjected to a rounding operation to produce an (i+1)st partial square root $b_{i+1}$; and a sum of partial square roots, found in said first to ith iterative operations, i.e., a sum of $b_1+\ldots+b_i$, is multiplied by two, and said $b_{i+1}$ is added to a result of said multiplication operation, and, taking a result of said addition operation and said $b_{i+1}$ as a multiplicand and as a multiplier, respectively, a multiplication operation is performed to find a product, and said product found is subtracted from said $R_i$ to find an (i+1)st partial square root $R_{i+1}$;

said square root processing unit comprising:

a means for rounding up said $b_1$ if said first iterative calculation shows that a portion lower than a least significant bit of said $b_1$ is greater than or equal to a half quantity of said $b_1$'s least significant bit; and a means for rounding up said $b_{i+1}$ if said each iterative calculation following said first iterative calculation shows that a portion lower than a least significant bit of said $b_{i+1}$ whose position is higher by one bit than said $b_1$'s least significant bit is greater than or equal to a quarter of said $b_{i+1}$'s least significant bit.

6. A division processing unit for performing a division operation of a bit-normalized dividend operand by a bit-normalized divisor operand to find a quotient, said division processing unit comprising:

a table information store means for storing an approximation of a reciprocal of a divisor; and a means for indexing said table information store means by an address composed of a plurality of successive bits following a most significant bit of said divisor operand;

said table information store means including:

an entry that is accessed by an address composed of (N+1) bits from a head bit of said plural successive bits where said number N is a plus integer if said head bit is 0;

an entry that is accessed by an address composed of N bits from said head bit if said head bit is 1; and an entry that is accessed by an address composed of (N+1) bits from said head bit if said head bit is 1.

7. The division processing unit of claim 6 wherein:

said table information store means has a single memory that has both an entry that is accessed if said head bit is 0 and an entry that is accessed if said head bit is 1.

8. The division processing unit of claim 7 wherein:

said each entry of said memory stores a flag to identify an address length; and said division processing unit further includes a means for appending, to a low-order position of an approximation of the reciprocal of a divisor read from said memory, either the inverse of an (N+1)st bit from said head bit if said flag indicates that said address length is N bits or the inverse of an (N+2)nd bit from said head bit if said flag indicates that said address length is (N+2) bits.

9. The division processing unit of claim 6 wherein:

said table information store means includes:

a first memory having an entry that is accessed if said head bit is 0;

a second memory having an entry that is accessed if said head bit is 1; and a means for selecting between an output of said first memory and an output of said second memory in accordance with said head bit's value.

10. The division processing unit of claim 9 wherein:

said each entry of said second memory stores a flag to identify an address length; and said division processing unit further includes a means for appending, to a low-order position of an approximation of the reciprocal of a divisor read from said second memory, either the inverse of an (N+1)st bit from said head bit if said flag indicates that said address length is N bits or the inverse of an (N+2)nd bit from said head bit if said flag indicates that said address length is (N+2) bits.

11. A mathematical function processing unit for finding a mathematical function of one or more variables, said mathematical function processing unit comprising:

a table information store means for storing either a function initial value or a numeric value used during the course of a calculation process; and a means for indexing said table information store means by an address composed of a portion of a value of a particular variable;

said table information store means including:

an entry that is accessed by an address having an address length of N bits, where said number N is a plus integer; and an entry that is accessed by an address having an address length of (N+1) bits.

12. The mathematical function processing unit of claim 11 wherein:

said table information store unit includes:

an entry that is accessed by an address having a head bit of 0 and having an address length of (N+1) bits; and an entry that is accessed by an address having a head bit of 1 and having an address length of N bits.

13. The mathematical function processing unit of claim 12 wherein:

said table information store means further includes an entry that is accessed by an address having a head bit of 1 and having an address length of (N+1) bits.

14. The mathematical function processing unit of claim 11 wherein:

said table information store means includes:

an entry that is accessed by an address having a head bit of 0 and having an address length of N bits; and an entry that is accessed by an address having a head bit of 1 and having an address length of (N+1) bits.

15. The mathematical function processing unit of claim 14 wherein:

said table information store means further includes an entry that is accessed by an address having a head bit of 0 and having an address length of (N+1) bits.

16. A mathematical function processing unit for finding a mathematical function of one or more variables, said mathematical function processing unit comprising:

a table information store means for storing either a plurality of function initial values or a plurality of numeric values used during the course of a calculation process as plural items of data; and a means for indexing said table information store means by an address composed of a portion of a value of a particular variable;

said table information store means including:

an upper memory having plural entries for storing only upper bits of said plural data items which differ from one another; and an upper decoder for decoding a given address to select one of said plural entries of said upper memory.

* * * * *